US006402064B1

(12) United States Patent
Tango et al.

(10) Patent No.: US 6,402,064 B1
(45) Date of Patent: Jun. 11, 2002

(54) METHOD AND SYSTEM FOR CARRYING OUT TREATMENT OF GRANULAR SUBSTANCES WITH POLLUTANTS ADHERED

(75) Inventors: Takao Tango; Yo Ito; Hirohiko Shibata; Kenji Kawaguchi; Yutaka Shida, all of Tokyo (JP)

(73) Assignees: Shinroku Seiki Kabushiki Kaisha, Saitama-ken; Youyu Shigen Kabushiki Kaisha, Tokyo; Kabushiki Kaisha Kamagaigumi, Fukui-ken, all of (JP)

( * ) Notice: Subject to any disclaimer, the term of this patent is extended or adjusted under 35 U.S.C. 154(b) by 0 days.

(21) Appl. No.: 09/422,782

(22) Filed: Oct. 21, 1999

(30) Foreign Application Priority Data

| Oct. 30, 1998 | (JP) | 10-310429 |
| Oct. 30, 1998 | (JP) | 10-310441 |
| Oct. 30, 1998 | (JP) | 10-310448 |
| Nov. 18, 1998 | (JP) | 10-328210 |
| Mar. 26, 1999 | (JP) | 11-083261 |
| Mar. 30, 1999 | (JP) | 11-090092 |
| Jun. 8, 1999 | (JP) | 11-161609 |
| Jun. 8, 1999 | (JP) | 11-161610 |
| Jun. 8, 1999 | (JP) | 11-161611 |
| Aug. 6, 1999 | (JP) | 11-223764 |
| Aug. 6, 1999 | (JP) | 11-223765 |
| Aug. 6, 1999 | (JP) | 11-223766 |
| Aug. 6, 1999 | (JP) | 11-223767 |

(51) Int. Cl.$^7$ ............................................. B02C 19/12
(52) U.S. Cl. ........................................ 241/21; 241/29
(58) Field of Search ............................ 241/21, 29, 228, 241/159

(56) References Cited

U.S. PATENT DOCUMENTS 4,175,814 A 11/1979 Ozasa et al.
5,318,227 A 6/1994 Rogers

FOREIGN PATENT DOCUMENTS

| EP | 0618327 A1 | 10/1994 |
| JP | 8-164363 | * 6/1996 |

* cited by examiner

*Primary Examiner*—Mark Rosenbaum
(74) *Attorney, Agent, or Firm*—Wolf, Greenfield & Sacks, P.C.

(57) ABSTRACT

Granular substances with pollutants adhered, such as contaminated soils and incinerated ashes, are finely granulated to separate the pollutants from the granular substances efficiently and to enable the granular substances, from which pollutants have been separated, to be recycled. After fine granulation of the granular substances by a coarse disintegrating treatment through a first fine granulation machine, the granular substances, which have been finely granulated by the first fine granulation machine, are subjected to, by a second fine granulation machine, mutual polishing among the granular substances by mutual rubbing forces of the substances themselves and thus the pollutants, such as heavy metals and dioxin class substances adhering strongly to the surfaces of the granular substances, are separated, and also the granular substances not containing the pollutants are classified from the granular substances which have already been finely granulated by a vibrational screen and a classification device.

7 Claims, 31 Drawing Sheets

(DISINTEGRATION)

(GLUE BREAKING)

FIG.11 RESULT OF ELUTION TEST OF HEAVY METALS

UNIT (mg/LITER)

| | LEAD | CADMIUM | TOTAL MERCURY | SILICON | HEXAVALENT CHROMIUM | SELENIUM | COPPER |
|---|---|---|---|---|---|---|---|
| REFERENCE VALUE | 0.01 | 0.01 | 0.0005 | 0.01 | 0.05 | 0.01 | 125 |
| DETERMINATION LIMITATION | 0.001 | 0.001 | 0.00005 | 0.001 | 0.005 | 0.001 | 0.01 |
| CRUDE ASH | 0.22 | N.D. | N.D. | N.D. | N.D. | N.D. | 0.43 |
| SAND AFTER GLUE BREAKING TREATMENT | N.D. | N.D. | N.D. | N.D. | N.D. | N.D. | 0.09 |
| DEHYDRATED CAKE | N.D. | N.D. | N.D. | N.D. | N.D. | N.D. | 0.19 |
| DRAIN OF WASHING WATER | 0.19 | 0.01 | N.D. | N.D. | N.D. | 0.011 | 0.17 |

N.D.= NOT DETECTED

FIG.13

CONCENTRATION OF DIOXIN ON THE PROCESS OF TREATMENT

| SOLID SUBSTANCE | INCINERATED ASH | SAND BELOW 5mm | GRAVEL EXCEEDING 5mm | SEDIMENTARY CONTAMINATED MUD |
|---|---|---|---|---|
| CLASS OF DIOXIN (ng.TEQ/g) | 1.2 | 0.081 | 0.012 | 0.41 |
| AQUEOUS SOLUTION | SUPERNATANT LIQUID OF DEPOSITION CISTERN | SEWAGE TREATMENT | DETACHMENT LIQUID | — |
| DIOXIN (pg.TEQ/L) | 200 | 6.0 | 30 | |

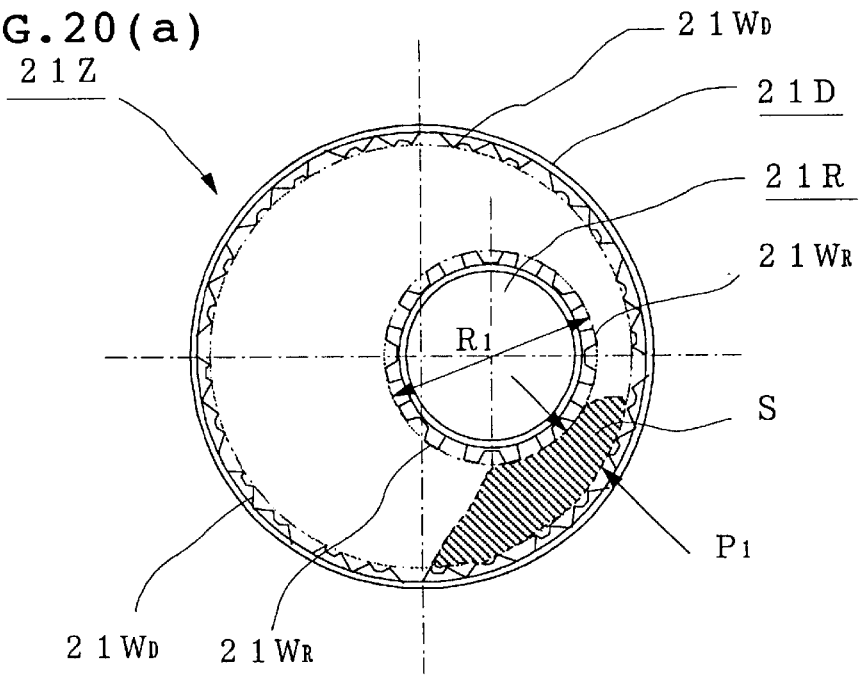
(FIRST FINE GRANULATION MACHINE)
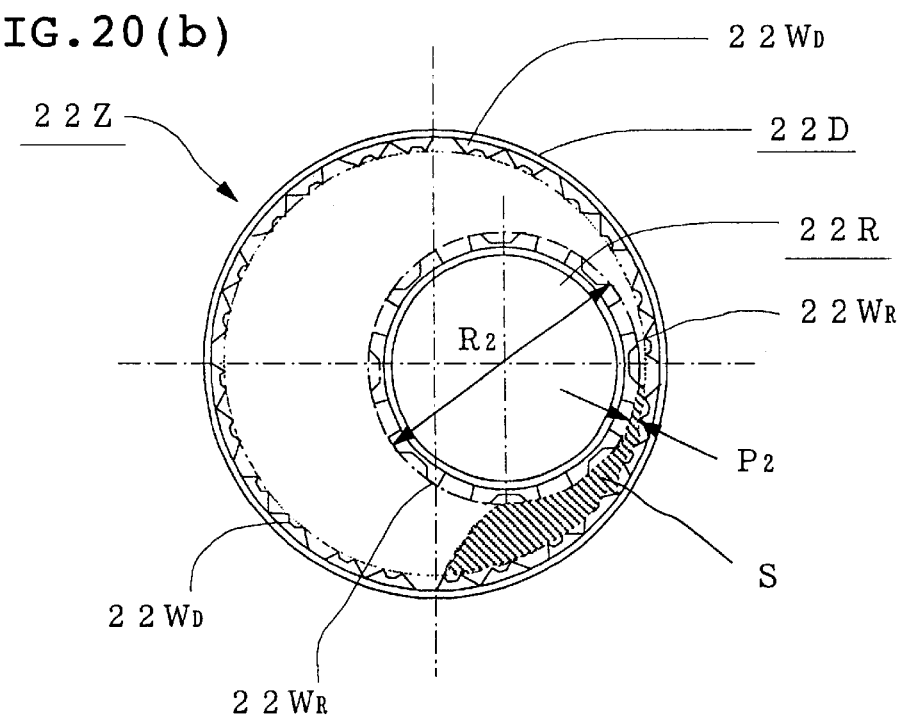
(SECOND FINE GRANULATION MACHINE)

(DISINTEGRATION)

(GLUE BREAKING)

METHOD AND SYSTEM FOR CARRYING OUT TREATMENT OF GRANULAR SUBSTANCES WITH POLLUTANTS ADHERED

BACKGROUND OF THE INVENTION

1. Field of the Invention

The present invention relates to a method for finely granulating granular substances with pollutants such as incinerated ashes adhered.

The present invention relates to a method for carrying out fine granulation of granulating granular substances with pollutants such as soils contaminated by heavy metals, oily constituents and the like adhered and incinerated ashes conveyed from through flying incinerator and also carrying out separation of granular substances without containing pollutants or granular substances, from which most of the pollutants are removed, from the granular substances which are subjected to fine granulation treatment mentioned as above.

2. Description of the Prior Art

Hitherto, unrecycable inflammable substances such as unrecycable raw garbages have been burnt up through a stoker type or fluidized bed type incinerator and the burnt up ashes have been transferred as incinerated ashes to a disposal plant.

In actual incinerated ashes, burnt up scraped metal, fragments of burnt up scraped metals, potteries or earth and sand those of which are burnt up being mixed in the inflammable substances as mentioned above are contained, and consequently in the constituents of incinerated ashes various kinds of metals, silica, alumina and lime are mixed. Since this sort of incinerated ashes are large in scraped volume and are adhered with noxious materials such as heavy metals and dioxin class substances and the like, which are produced during the incineration process, establishment of a technology for method of reduction of volume of the incinerated ashes, rendering the same to be non-noxious or recycling the same.

A method for reducing the noxious heavy metals such as lead, zinc, copper and cadmium to unnoxious following methods are enumerated: (1) solidification through fusion, (2) solidification by cement, (3) treatment by agent, (4) stabilization by acid or other solvent, (5) treatment by carbonation and (6) washing by water. Among those, the surest method is the solidification through fusion of (1) and this method is to scrap the incinerated ashes to a disposal plant or recycle them as extra minute fragments of grains after fusion at a high temperature exceeding 150° C. and today this method is put to practical use. In this method, even when the fused substances contact with water, elution of heavy metals mentioned as above is not said to happen because the heavy metals are trapped within the fused substances.

Since in the method 2 of solidification by cement, the cement is mixed in the incinerated ashes, there exists a fatal disadvantage that the volume of the incinerated substances increases. Further, alkaline of the incinerated ashes, which are subjected to mixing cement in them, is intensified and hence risk of elution of lead and the like is rather built up. In the method 3 of treatment by agent, a pH adjustment is important and still, due to the reason that kinds of substances contained in the incinerated ashes are varied and not to be fixed, pH adjustment is not easy and addition of agent is supposed not to be effective when the pH adjustment is not carried out adequately. In the method 4 of stabilization by acid or other solvent, because the stabilization is carried out in a condition with heavy metals remained, it is hard to prevent heavy metals from elution in long term. In the method 5 of treatment by carbonation, maintenance control of the plant is hard and further equipments are complicated and hence this method is not practical. In the method 6 of washing by water, it is supposed that removal of heavy metals are carried out relatively easily if the environment is not acidified by acid rain but the effect of the method is merely assured by flying ashes in the powder state. Consequently, in this method sufficient effect can not be anticipated for the heavy metals and dioxin class substances adhered to granular substances in a massed granular state.

Also the aforementioned method of solidification through fusion allows reducing dioxin class substances to be unnoxious by thermal discomposition by virtue of a high temperature of treatment of the incinerated ashes, in view of the present situation it is said that this method of solidification through fusion is most effectual and hence this method bears main stream among various method.

However, in view of considerations over a long period of time, in the solidification through fusion too, the possibility of elution of heavy metals trapped within the fused substances buried in the disposal plant can not be denied. Further, there gives rise problems such that construction cost of the facilities and treatment cost are high because large facilities such as incinerating furnace and a large quantity of fuel are required for the solidification through fusion due to high temperature for fusing incinerated ashes.

On the other hand, in recent years, there gives rise to a problem such that soils in the vicinity of chemical factories and metal refineries are contaminated by heavy metals, organic chlorine or oily constituents. Also beach shore soils contaminated by crude oil being effluent to ocean because of disasters at sea and also crude oil adheres to the drug out soils which are conveyed through a tunnel digging of a land subsidence at the area of crude oil deposited and consequently the treatment of such soils becomes hard frequently. Further, the soils with pollutants in questions adhered (contaminated soils) include the soils which are contaminated by mixing aforementioned incinerated ashes into them.

As to soils contaminated mentioned as above too, establishment of a technology for removing aforementioned pollutants and for recycling stones, sands and extra minute grains contained in the contaminated soils after extracting them is anticipated.

Generally speaking, it is said that dioxin class substances adhered to the incinerated ashes sticks to relatively strongly to the surfaces of granular substances with diameters below 2 mm in the incinerated ashes. Then, upon classifying granular substances with diameters more than 5 mm from the incinerated ashes, carrying out treatment for removing dioxin class substances adhered relatively weakly to the aforementioned surfaces, those granular substances are supposed to be unnoxious and allowable to be recycled. In spite of such a situation, as far as the inventor of the present invention is concerned, no methods are proposed for separating the incinerated ashes in a state of massed granular substances to individual granular substances without crushing them and also detaching the dioxin class substances from the granular substances below 2 mm to which dioxin class substances is said to stick relatively strongly.

Also since the incinerated ashes are formed of a soft texture, it is not only hard to detach dioxin class substances adhered to them by means of an usual crushing machine but it is not possible to do so because, if the incinerated ashes are crushed by crushing machine, for example a ball mill, the granular substances of the incinerated ashes are also granulated and thus the granular substances with dioxin class substances adhered can not be separated and, on the contrary, reduction of their volume becomes hard.

In the contaminated soils, though the portions where the granular substances mutually constituting soil grains become to a massed granular state are limited, likewise the aforementioned incinerated ashes, not only detachment of pollutants as above by means of an usual crushing machine is hard but also soil grains in the contaminated soils too are reduced to be granulated because the diameters of pollutants such as heavy metals and oily constituents are extremely small; thus separation of those pollutants are hard.

On the other hand, Japanese Laid-Open Patent Application No. 8-164363 discloses a crushing machine 10 for removing acute angle portions of stones and the like in the dredged soils without crushing dredged soils containing sands, gravels and clays and also for crushing the clods of solids, sands and the like. FIGS. 32(a) and (b) show constitution of the crushing machine 10: (a) is a side view and (b) is sectional view cut away along A—A of (a). The crushing machine 10 is provided with a rotary drum 6 having a plurality of outer blades 6W, which are attached along its inner peripheral surface in its axial direction protruding toward its center, and is provided with a rotor 7 being installed within the rotary drum 6 eccentrically with it having a plurality of inner blades which are attached to its outer peripheral surface protruding in radial direction; an annular gear provided on the periphery of the rotary drum 6 is driven by a motor 8 and the rotary shaft 7a attached to the rotor 7 is driven by a driving unit 7b, and by rotating the rotary drum 6 and rotor 7 in a mutually reversed direction, carries out crushing substances such as dredged soils thrown into the crushing machine 10 upon compressive forces and shearing stresses exerted on the substances thrown into and polishing the substances which have been crushed through mutual frictions among the crushed substances themselves. Now the crushing treatment by the crushing machine 10 is carried out in a dried or wet condition at the time of polishing the crushed stones and is carried out while pouring water to the substances poured at the time of rendering the earth and sands such as dredged soils such as sands, gravels and clays to extra minute grains. The magnitude of stress to be exerted on the above substances poured into is adjusted mainly by gap between the rotary drum 6 and the rotor 7 (degree of eccentricity of the rotor 7) and by respective rotation speeds of the rotary drum 6 and rotor 7.

The Problem to be Solved by the Invention

And though the above prior art discloses an example for crashing gravels and stones contained in the dredged soils by the crushing machine 10 yet, means for separating granulated substances being reduced to massed grains such as incinerated ashes obtained by burning up sources of organic substances such as raw-garbages and inflammable substances without destroying the above granular substances or for rendering incinerated ashes to unnoxious by separating heavy metals and dioxin class substances adhering to the granular substances in the incinerated ashes are not suggested at all.

Also, as far as relying on the crushing machine 10, it was hard to effectively detach the pollutants adhering to each of granular substances consisting of soil grains of the above contaminated soils when the substances to be treated are the contaminated soils adhered with pollutants having a large viscosity such as carbon and oily constituents or when the contaminated soils are such that heavy metals, i.e. pollutants, adhere strongly to each of the individual granular substances.

Further, none of the means are suggested for recycling unnoxious substances obtained through separating pollutants from incinerated ashes and contaminated soils.

The present invention has been made in view of the problems in the past, and its object is to provide a method and system for treatment of granular substances with pollutants adhered which enable to carry out fine granulation of the granular substances with pollutants, such as contaminated soils and incinerated ashes, adhered and to carry out separation and removal of the pollutants efficiently and further to carry out recycling the unnoxious granular substances with pollutants separated.

SUMMARY OF THE INVENTION

A method of carrying out treatment of granular substances with pollutants adhered according to a first aspect of the present invention including a step of finely granulating the granular substances by a fine granulation means in which the granular substances with pollutants adhered are poured into a treatment gap of the fine granulation means and in which granular substances are separated into independent granular substances and also in which the pollutants adhering to surfaces of the granular substances are separated by having compressive forcers exerted on the granular substances and having mutual rubbing forces acted on the same among themselves while adding water to the poured granular substances with pollutants adhered, and characterized in that fine granulation step, the compressive stress to be exerted on the granular substances are arranged to be gradually increased.

In detail, this invention is characterized in that at first by having the compressive stresses exerted on the granular substances with pollutants adhered, treatment of fine granulation, i.e. separation of the granular substances, which are in the state of massed granular substances being formed by mutual sticking of many granular substances among themselves, with pollutants adhered into almost independent granular substances without destroying them is carried out (hereinafter referred to as disintegrating treatment); and next, by having mainly mutual rubbing forces acted on the finely granulated granular substances upon increasing stresses to be applied to them and causing mutual polishing by mutual frictions among the granular substances and thus the pollutants adhering to granular substances are separated (hereinafter referred to as glue breaking treatment).

A method of carrying out treatment of granular substances with pollutants adhered according to a second aspect of the present invention is characterized in that after carrying out the fine granulation treatment on the granular substances with pollutants adhered by a single fine granulation means, carrying out the fine granulation treatment for the second time by pouring the granulation substances, which were already subjected to the fine granulation treatment, into the same fine granulation means and at the time of second treatment, stress to be applied to granular substances are made larger than the one being applied previously.

A method of carrying out treatment of granular substances with pollutants adhered according to a third aspect of the present invention is characterized in that the treatment is carried out by the fine granulation means which is provided with a cylindrical rotary drum having a plurality of outer blades attached to an inner peripheral surface of the rotary drum toward its center and a rotor having a plurality of inner blades, which are attached to an outer peripheral surface along an axial direction protruding in a radial direction of said rotor, and being installed within the rotary drum eccentrically with the same and having arranged to rotate in a reversed direction of the rotary drum.

A method of carrying out treatment of granular substances with pollutants adhered according to a fourth aspect of the present invention is characterized in that, under a condition that hard substances are mixed in the granular substances with pollutants adhered, the fine granulation treatment is carried out by accelerating the substances by rotating the rotary drum and the rotor in a mutually reversed direction.

A treatment means of granular substances with pollutants adhered according to a fifth aspect of the present invention is provided with a single fine granulation means in which by having compressive forces exerted on the granular substances with pollutants adhered and by having mutual rubbing forces acted on the same among the substances themselves, which have been poured into a treatment gap of the treatment system, while adding water to the granular substances, the granular substances are separated to independent granular substances and also the pollutants adhering to surfaces of the granular substances are separated, wherein the treatment gap of the fine granulation means is set narrow on the downstream side, so that the disintegration and glue breaking treatments of the granular substances with pollutants adhered can be carried out efficiently.

A treatment system of granular substances with pollutants adhered according to a sixth aspect of the present invention is provided with a plurality of fine granulation means over a plurality of stages for separating the granular substances to independent granular substances and separating the pollutants adhering to surfaces of the granular substances, while adding water to the granular substances being poured into a treatment gap, by having compressive forces exerted on the granular substances with pollutants adhered and by having mutual rubbing forces acted on the same among the substances themselves and the granular substances are arranged to pass through successively each of the granulation means and the treatment gaps are set gradually narrower at downstream stages.

A treatment system of granular substances with pollutants adhered according to a seventh aspect of the present invention, wherein a means for carrying out dehydration treatment of a slurry discharged from a prestage fine granulation means is provided and the substances which have been subjected to the dehydration treatment, are poured into the fine granulation means of latter stage.

A fine granulation system for carrying out treatment of granular substances with pollutants adhered according to an eighth aspect of the present invention employs a fine granulation means and the fine granulation means is provided with a cylindrical rotary drum having a plurality of outer blades attached to an inner peripheral surface of the rotary drum toward its center and a rotor having a plurality of inner blades, which are attached to an outer peripheral surface along an axial direction protruding in a radial direction of the rotor, and being installed within the rotary drum eccentrically with the same and being adapted to rotate reversely against the rotary drum.

A treatment system of granular substances with pollutants adhered according to a ninth aspect of the present invention, the treatment system carries out the fine granulation treatment of the granular substances with pollutants adhered such that the granular substances such as stones and gravels having large diameters, which have been mixed in the granular substances with pollutants adhered are classified from the slurry, which were discharged from a first stage fine granulation system, those separated granular substances having large diameters are poured into a latter stage fine granulation system and those granular substances having large diameters are accelerated by rotating the rotary drum and the rotor in a mutually reversed direction under a condition that the granular substances and granular substances having large diameters are mixed.

A method of carrying out treatment of granular substances with pollutants adhered according to a tenth aspect of the present invention is characterized in that the granular substances without containing pollutants and the granular substances having diameters inclusive of separated pollutants smaller than those of the granular substances without containing pollutants are separated out of the granular substances, which have been discharged from the fine granulation means according to the first aspect of the present invention, by a liquid cyclone.

A method of carrying out treatment of granular substances with pollutants adhered according to an eleventh aspect of the present invention is characterized in that the separation of the granular substances having large diameters without containing pollutants out of the granular substances, which were already subjected to the fine granulation treatment, is carried out by a negative pressure type liquid cyclone whose discharge pressure is raised by providing a nozzle consisting of an elastic material at a discharge port arranged at a lower portion of the liquid cyclone.

A method of carrying out treatment of granular substance with pollutants adhered according to a twelfth aspect of the present invention is characterized in that, after carrying out the fine granulation of the granular substances with pollutants adhered while adding water to the granular substances, the granular substances are stored in a liquid supply cistern of the liquid cyclone, a treatment water containing the granular substances are supplied to the liquid cyclone from a lower portion of the liquid supply cistern, and the granular substances are classified with respect to size of the same and also the treatment water containing the granular substances having small diameters discharged from an upper portion of the liquid cyclone is turned back to the liquid supply cistern.

BRIEF DESCRIPTION OF THE DRAWINGS

FIG. 11 is a table showing result of the analysis of the incinerated ashes which is subjected to the treatment by the continuous treatment according to Embodiment 2.

FIG. 13 is a table showing result of the analysis of the incinerated ashes which is subjected to the treatment by the continuous treatment according to Embodiment 2.

FIGS. 20(a), (b) are sectional views for comparison of constitution of the first and second fine granulation machines according to Embodiment 3.

DETAILED DESCRIPTION OF THE PREFERRED EMBODIMENTS

Subsequently, descriptions will be given of preferred Embodiments, referring to the accompanying drawings.

Embodiment 1

Figure 1:
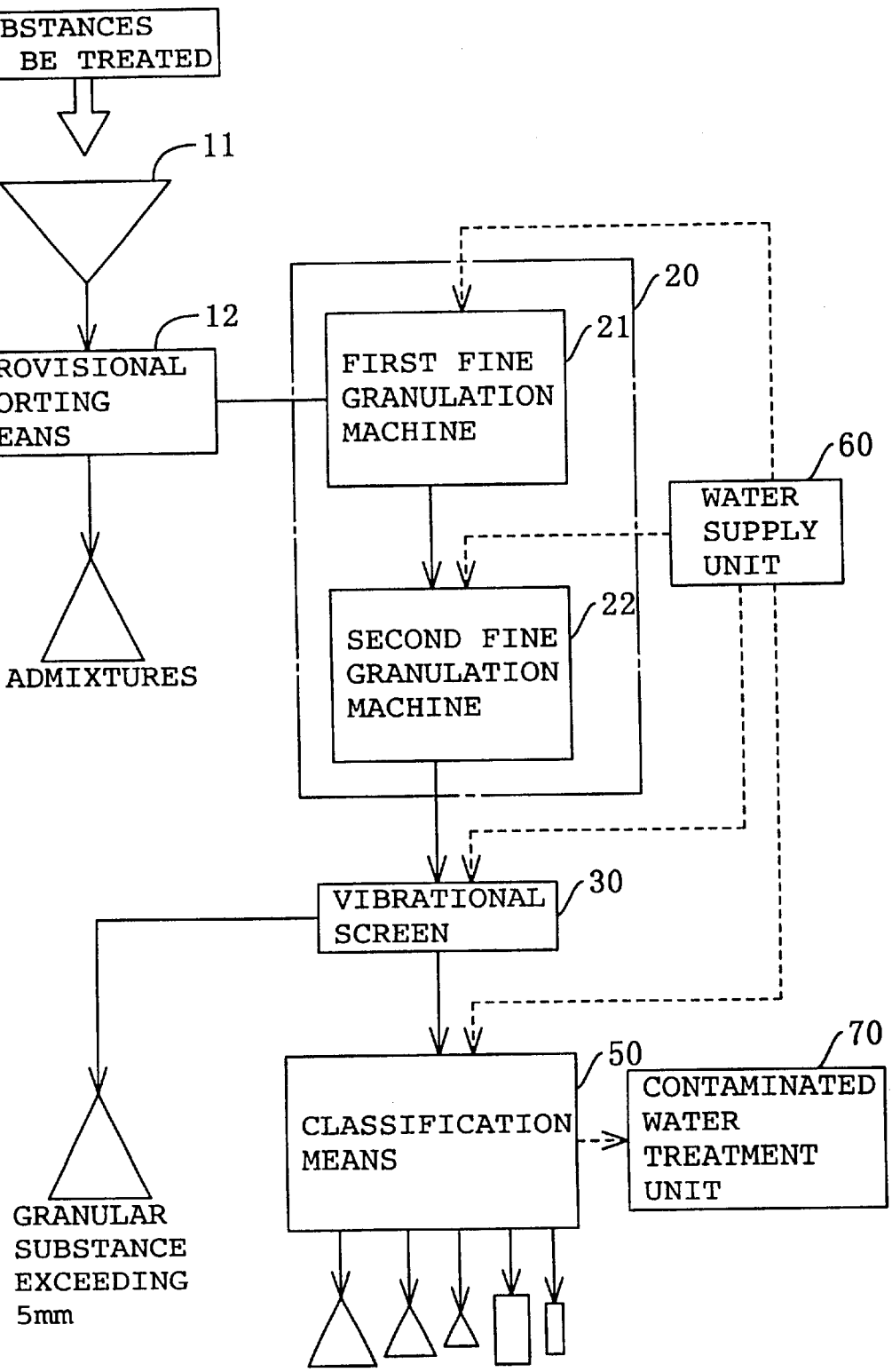
FIG. 1 is a block diagram showing constitution of the system for treatment of the granular substances with pollutants adhered according to Embodiment 1 of the present invention.

FIG. 1 is a block diagram showing a treatment system for granular substances with pollutants adhered according to Embodiment 1. In this drawing, 11 is a hopper for receiving granular substances with pollutants adhered, i.e. substances to be treated, 12 is a provisional sorting means for excluding admixtures exceeding several cm from the above granular substances poured from the receiving hopper 11, 20 is a fine granulation system (means) for carrying out fine granulation of the granular substances and consists of a first fine granulation machine 21, which carries out a coarse disintegration of the granular substances upon adding water to the granular substances with pollutants adhered and a second fine granulation machine 22 which carries out disintegration and glue breaking treatment of the granular substances which have been subjected to the granulation treatment through the first fine granulation machine, 30 is a vibrational screen for sorting and separating the granular substances exceeding 5 mm from the slurry containing granular substances subjected to the treatment of disintegration and glue breaking through the fine granulation system 20, 50 is a classification means comprising a classification unit such as a liquid cyclone and a thickner tank and for classifying the granular substances with respect to size from the slurry containing the granular substance below 5 mm supplied from the above vibrational screen, 60 is a water supply unit to the fine granulation system 20 and the classifying means 50, and 70 is a contaminated water treatment unit for purifying the treatment water discharged from the classification means 50.

Figure 2:
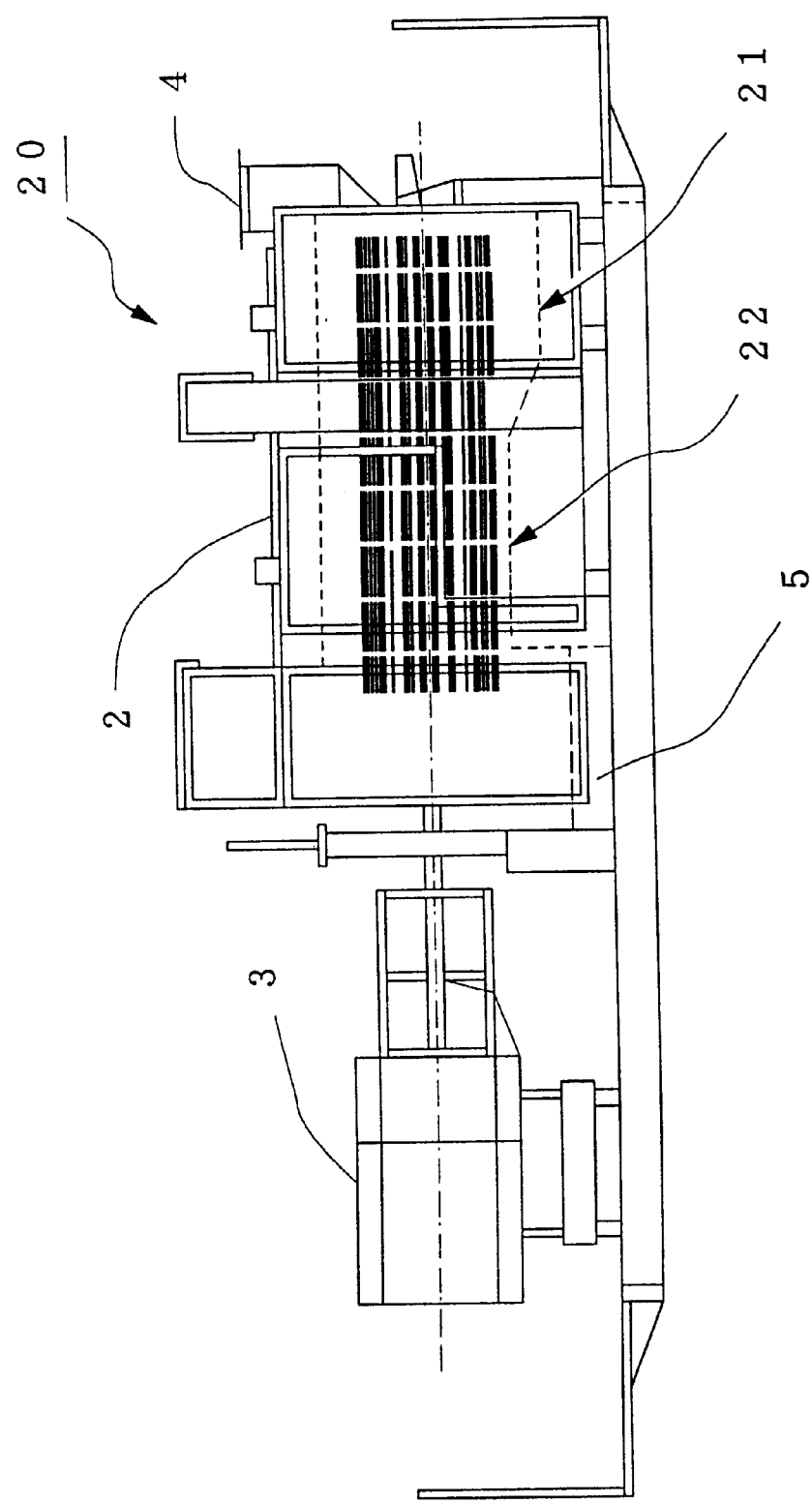
FIG. 2 shows the constitution of the fine granulation equipment according to Embodiment 1.

FIG. 2 shows an example of constitution of the fine granulation system which comprises the first fine granulation machine 21 and the second fine granulation machine and they are installed within a single shell 2 and are adapted to be operated by a common power unit 3. In FIG. 2, 4 is a treatment substance pouring port through which the granular substances with pollutants adhered are poured, 5 is a treatment substances discharging port for discharging the granular substances which have been disintegrated and glue broken successively within respective first fine granulation machine and the second fine granulation machine.

Both of the fundamental construction of the first fine granulation machine 21 and the second granulation machines 22 are almost similar to that of conventional crushing machine 10, but condition of operation is different from that of the crushing machine 10, which is based upon the condition of imposing the crushing as a prime duty on it but, on the contrary, the first fine granulation machine is set to the condition of putting the disintegrating treatment as its prime duty and the second fine granulation machine is set to the condition of putting the glue breaking treatment as its prime duty.

Figure 3A:
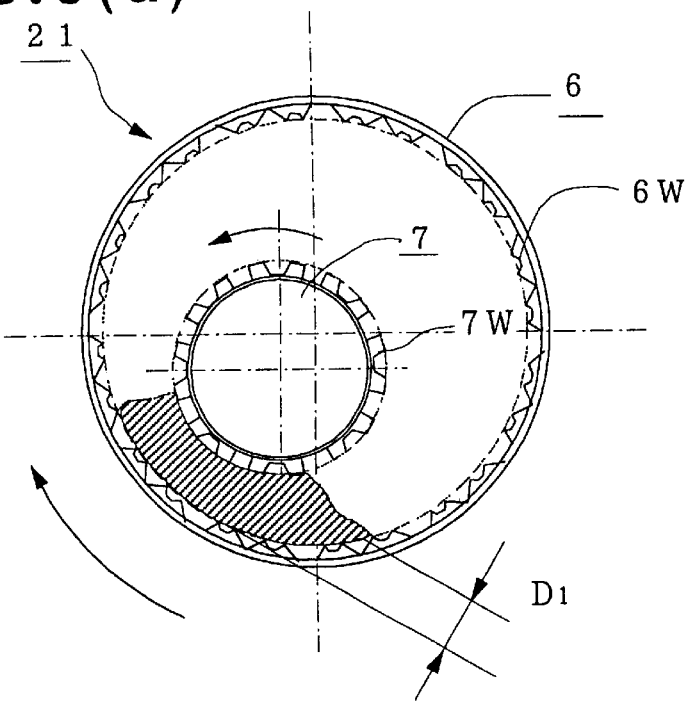
FIGS. 3(a), (b) show the setting condition of the fine granulation means according to Embodiment 1.
Figure 3B:
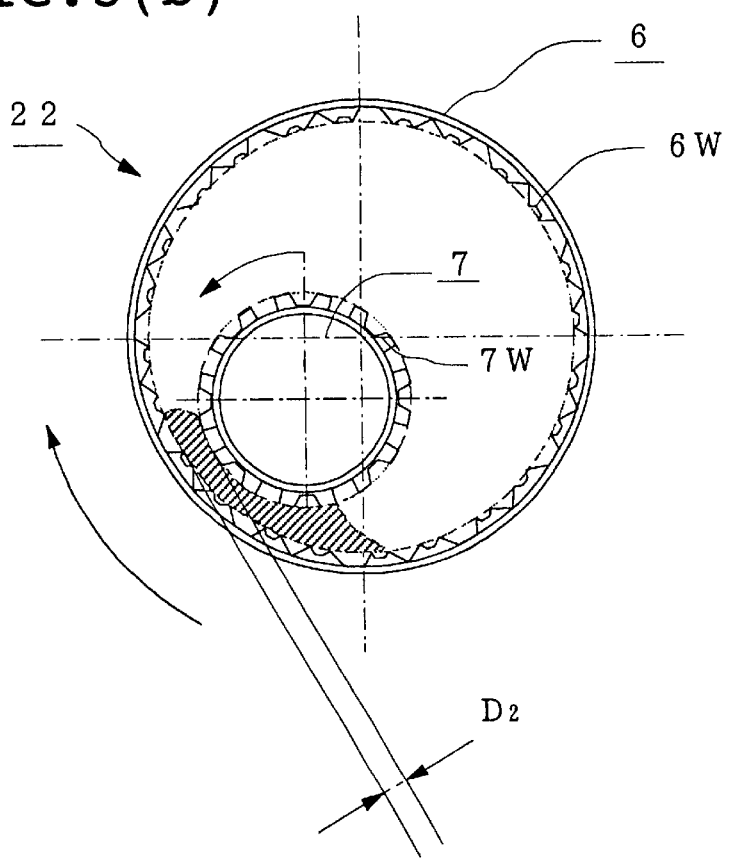

This is to say that in the first fine granulation machine 21 for carrying the coarse disintegrating treatment on the granular substances with pollutants adhered, as shown by FIG. 3(a) the gap $D_1$, between the rotary drum 6 and the rotor 7 is set to relatively wide by setting the amount of eccentricity of the rotor 7 small and the rotational speed is set to low; in the second granulation machine 22 for carrying blue breaking as the prime duty on the granular substances, as shown by FIG. 3(b), the gap $D_2$, between the rotary drum 6 and the rotor 7 is set to relatively narrow by setting the amount of eccentricity of the rotor 7 to large and also the rotational speed is set to high. Now, since the conventional crushing machine 10 mainly carries out crushing, it is supposed that the conventional crushing machine 10 employs further smaller gap between the rotational drum 6 and the rotor 7 than that of the second fine granulation machine 22 and also employs a higher rotational speed than that of the machine 22.

Figure 4:
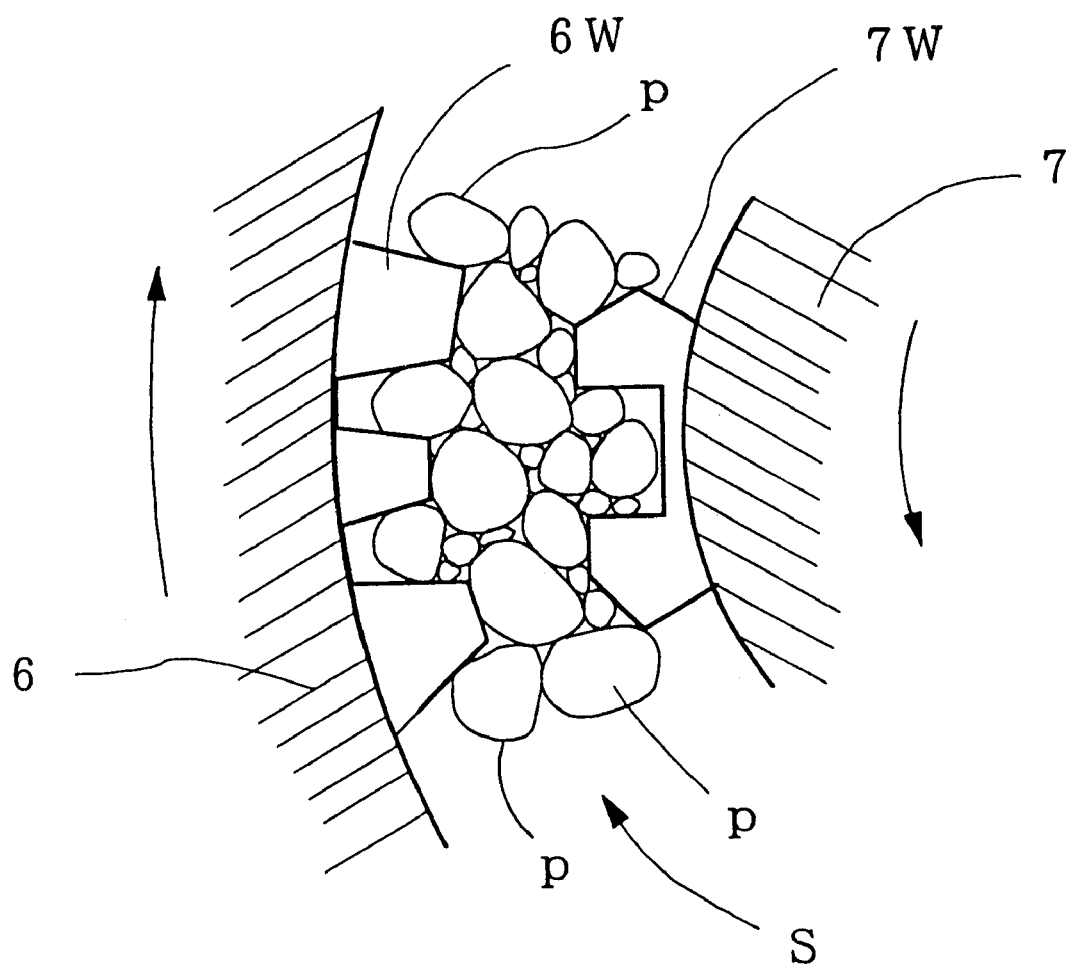
FIG. 4 illustrates actions of disintegration and glue breaking.

In the first fine granulation machine 21 or the second fine granulation machine 22, as shown by FIG. 4, the granular substances S with pollutants adhered are agitated upwardly by the outer blades 6W of the rotary drum 6 and as well as agitated downwardly by the inner blades 7W of the rotor 7, and as a consequence, compressive forces and shearing forces are exerted on each of individual granular substances of the granular substances S and thus disintegrating and glue breaking treatments are carried out.

Figure 5A:
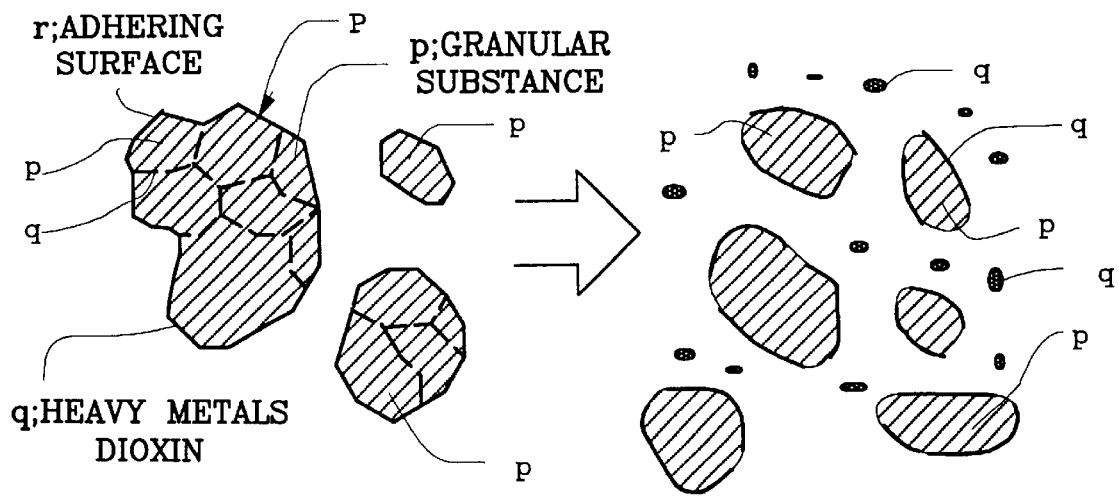
FIGS. 5(a), (b) illustrate actions of disintegration and glue breaking.
Figure 5B:
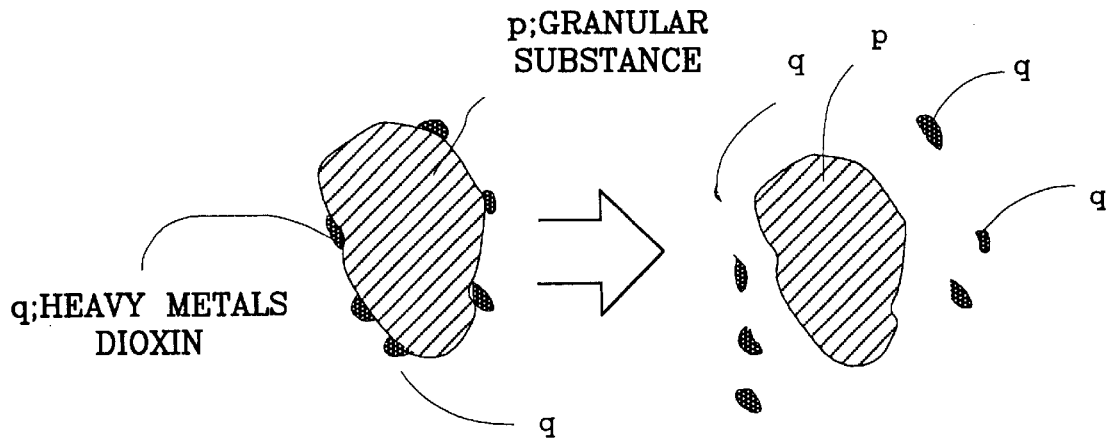

In other words, as shown by FIG. 5(a), the compressive forces or shearing forces are exerted on the each of individual granular substances P of the granular substances, in the state of massed granular substances, with pollutants adhered, which are formed by mutual sticking of individual granular substances P among themselves at the sticking surfaces r or are exerted on independent granular substances P, which are not mutually sticking but have large sizes, and as a consequence the individual granular substances P of the granular substance are separated from the portion of the sticking surface r and are thus finely granulated to almost independent fine granular substances P (disintegrating treatment) and also, as shown by FIG. 5(b), forces in rubbing directions are acted mutually on the granular substances and, by virtue of the mutual frictions acted on the individual granular substances P, pollutants q such as heavy metals and dioxin class substances adhering to the surfaces of the individual granular substances P are exfoliated and separated from the individual granular substances P (glue breaking treatment). Now, the pollutants q adhere not only to the massed granular substance P but to the sticking surfaces r which are surfaces of individual granular substances P (FIG. 5(a)). Therefore, at the time of disintegration, though it may occasionally happen that part of the pollutants q adhering to the surfaces of the massed granular substances are party exfoliated, at the time of the glue breaking treatment, most of the pollutants q are separated from the surfaces of individual granular substances P. Also among individual granular substances P having large sizes, some of them may happen to be finely granulated through crushing.

Further, the treatment water is supplied to the first fine granulation machine 21 and the second fine granulation machine 22, from the water supply unit 70 through unshown water supply port. Therefore, since the granular substances with pollutants adhered being poured into the fine granulation system 20 are disintegrated and glue broken under the condition that the treatment water is added, the heavy metals and dioxin class substances, among the exfoliated pollutants, are dissolved or suspended as extra minute fragments in the treatment water.

Next, method of treatment of granular substances with pollutants adhered carried out by the treatment system mentioned as above will be described taking up an example for the case where the substances to be treated are incinerated ashes.

At first, incinerated ashes poured into the hopper 11, after admixtures exceeding several cm are excluded through the provisional sorting unit 12, are poured into the first fine granulation machine from the pouring port of the fine granulation system 20. The first fine granulation machine 21 having a wide gap between the rotary drum 6 and the rotor 7, carries out a course disintegration on the incinerated ashes being mixed with the treatment water and moves the ashes to the down stream side of the first granulation machine 21 and transfer them to the second fine granulation machine 22 while separating the individual granular substances in the massed state of the incinerated ashes without destroying them. At this time, the extra minute fragments such as heavy metals and dioxin class substances, which weakly adhere to the surfaces of the incinerated ashes, are exfoliated and suspended in the treatment water and heavy metals, which are easily dissolved, are dissolved in the treatment water. Now, since stresses exerted on the incinerated ashes are set sufficiently lower in the first and second fine granulation machines 21, 22 than in the conventional machine, i.e. the crushing machine 10, the granular substances such as sands, gravels and fragments of potteries mixed in the incinerated ashes are discharged without being crushed.

Because the second fine granulation machine 22 has a larger gap between the rotary drum 6 and the rotor 7 than the first fine granulation machine 21 has and also because its rotation speed is high, the machine 22 moves the incinerated ashes to the down stream side, while having the incinerated ashes separated further into extra minute granular substances (disintegration) and having part of the granular substances, which have large sizes, finely granulated and having extra minute fragments such as heavy metals and dioxin class substances, which adhere to incinerated ashes strongly, detached by their mutual frictions among themselves, and transfer them to the vibrational screen 5 from the treatment substance discharge port 5. At this heavy metals, which dissolve easily, dissolve in the treatment water and the extra minute fragments such as heavy metals and dioxin class substances detached from the granular substances are, under the condition of being suspended in the treatment water, discharged together with incinerated ashes from the treatment substance discharge port 5.

The vibrational screen 30 sieves out the granular substances exceeding 5 mm contained in the incinerated ashes while adding water to the incinerated ashes in slurry state conveyed from the fine granulation system 20. Those granular substances below 5 mm passing through the vibrational screen 30 are transferred to the classification means 50 and are classified to the granular substances having various sizes. Also those detached heavy metals and dioxin class substances are treated upon being transferred to the classification means 50 together with the treatment water, and also are treated upon being transferred to the contaminated water treatment unit 70 through the classification means 50. on the other hand, since the granular substances exceeding 5 mm (mainly gravels, extra minute fragments of potteries and the like trapped) at the vibrational screen 30 are hardly adhered with heavy metals an d dioxin class substances, they are unnoxious and are thus allowed for recycling.

The classification means 50 is provided for classifying and extracting the granular substances having various sizes such as sands, extra minute sands, fine granular substances, which are constituents of ashes, and the like from the muddy incinerated ashes containing granular substances less than 5 mm; and upon regarding the extra minute grain fragments smaller than approximately 20 $\mu$m, which were classified through the classification means 50, as extra minute fragments containing large amount of dioxin class substances, those extra minute fragments are treated for rendering them to be unnoxious by means of, for example, solidification through fusion. On the other hand, heavy metals, which are contained or eluded in the treatment water, are subjected to the treatment by an agent and the like in the contaminated water treatment unit 70 and then are separated from the treatment water. Accordingly, the aforementioned treatment water, which has been purified, can be recycled as circulating water. Also the muddy soils containing granular substances exceeding 20 μm, from which heavy metals and dioxin class substances have be en already removed, can be recycled.

The treatment method of the contaminated soils are similar to that of the incinerated ashes an d yet, soil grains taking the state of massed granular substance is considered to be rare and then in the first fine granulation machine 21 and together with the second fine granulation machine 22 mainly the glue breaking treatment as shown by FIG. 5(b) is carried out. Also in the case where the contaminated soils contain incinerated ashes, the first fine granulation machine 21 carries out the coarse disintegration treatment and the second fine granulation machine 22 carries out disintegration and glue breaking.

In this way, according to the Embodiment 1, by the first fine granulation machine 21, which has relatively wide gap $D_1$ between the rotary drum 6 and the rotor 7 and employs a low rotational speed, the granular substances with pollutants adhered are finely granulated by subjecting them a coarse disintegrating treatment and thereafter by the second fine granulation machine 22, which has the narrow gap $D_2$ between the rotary drum 6 and the rotor 7 and employs a high rotational speed, the finely granulated substances carried out by the first granulation machine are subjected to the glue breaking treatment for separation of pollutants such as heavy metals and dioxin class substances strongly adhering to the above granular substances being finely granulated by the machine 21 by exerting mutual rubbing forces among that granular substances themselves and by thus causing mutual polishing so that the glue breaking treatment, i.e. separation of pollutants such as heavy metals and dioxin class substances strongly adhering to the surfaces of the granular substances, is carried out, and accordingly, removal of pollutants adhering to the contaminated soils and incinerated ashes can be carried out efficiently and also classification of the granular substances can be carried out easily. Also, by means of the vibrational screen 30 and the classification means 50, separation of the granular substances with pollutants not adhered are arranged to be carried out from the granular substances which have been subjected to the fine granulation treatment by the fine granulation system 20 and consequently, the granular substances, which have been reduced to unnoxious by separation of pollutants, can be reduced to a resource available for recycling and render them reusable.

In the Embodiment 1, using the fine granulation system 20, which are formed by unifying two units of the first fine granulation machine 21 and the second granulation machine 22 to a single system, two stages of treatments are carried out on the granular substances with pollutants adhered and yet, number of stages is not limited to the example as above. For example, by installing a third fine granulation machine, in which the gap between the rotor 7 and the rotary drum 6 is set smaller than that of the second fine granulation machine 22 on the downstream side of the second machine 22 so that glue breaking treatment is carried out further, then the pollutants such as heavy metals and dioxin class substances strongly adhering to the granular substances can be detached certainly.

On the contrary, a single fine granulation machine can be adapted to carry out repeatedly the treatment of the disintegration and the glue braking a plurality of times and also at the time of retreatment, by making larger the stress to be applied to the granular substances with pollutants adhered than the previous one, the disintegrating and glue breaking treatments can be carried out and which is attained by, at the time of retreatment, reducing the gap between the rotary drum 6 and the rotor 7 by making larger the amount of eccentricity of the rotor 7 than previous one, by increasing relative rotational speed of the rotary drum 6 and the rotor 7 or by increasing the amount of the eccentricity as well as the above rotational speed.

Figure 6A:
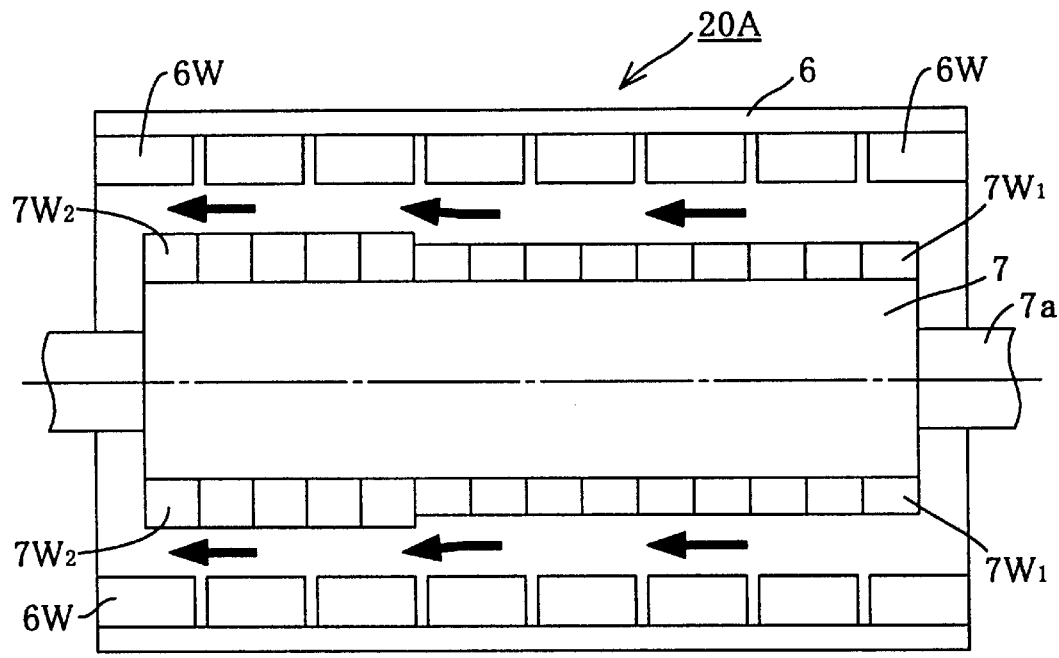
FIGS. 6(a), (b) show another example of the fine granulation equipment according to the invention.

As another arrangement, as shown by FIG. 6(a), by using a single unit of fine granulation system 20A in which the gap between the rotor 7 and the rotary drum 6, i.e. the treatment gap, is set to be narrowed stepwisely, in other words discontinuously, in the downstream direction by making the height, in the peripheral direction, of the inner blades $7W_2$ on the downstream side of the rotor 7 than that of the inner blades $7W_1$, the disintegrating and the glue breaking treatments can be carried so that stress to be applied to the granular substances with pollutants adhered being poured in are successively increased. This is to say that in a single unit of the fine granulation system 20A, by adapting a construction of making the treatment gap for carrying out treatment of the granular substances with pollutants adhered suddenly narrowed on the downstream side, the staying time period of the granular substances in the fine granulation system is lengthened and thus the treatment, disintegration as prime treatment, is carried on the granular substances with pollutants adhered. Thereafter, the glue breaking treatment is carried out as the prime treatment on the independent and individual granular substance which have been separated on the upstream side. By such a treatment, even a single unit of fine granulation system enables to carry out the disintegrating and glue breaking treatments continuously and efficiently.

Figure 6B:
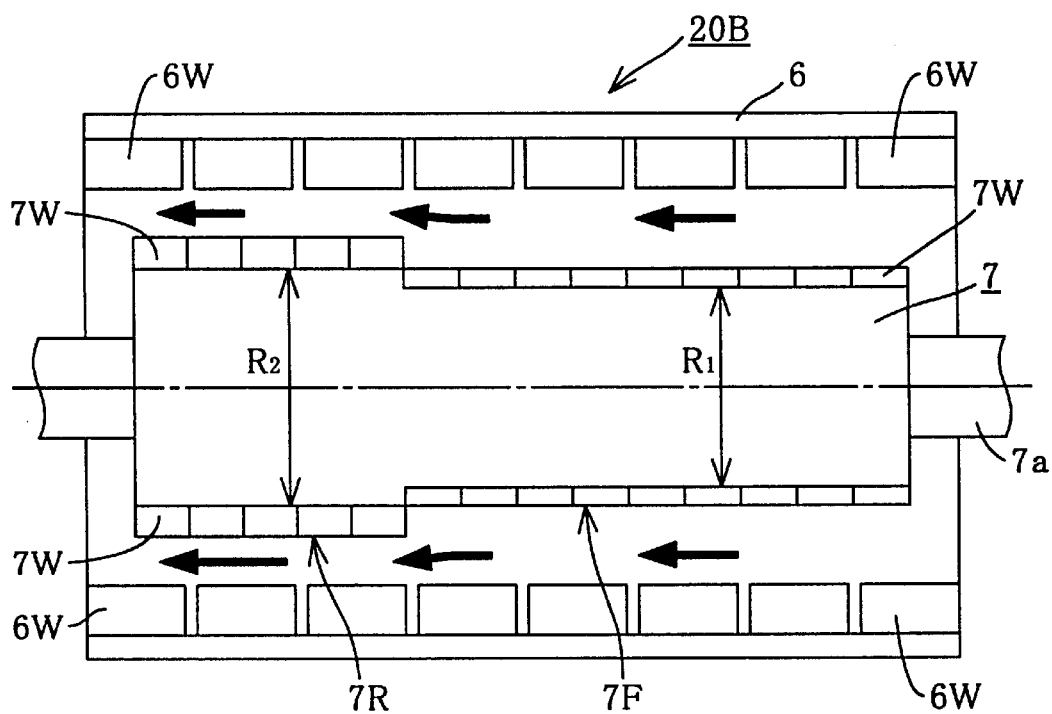

Also as shown by FIG. 6(b), by using the fine granulation system 2B, which is arranged such that, making height of the all of the inner blades 7W of the rotor 7 be the same and by making the outer diameter $R_2$ on the downstream side 7R of the rotor 7 larger than that of the outer diameter $R_1$ on the upper stream side 7F so that the gap between the rotor 7 and the rotary drum 6 is made to be small on the down stream side, similar to the aforementioned fine granulation equipment 20A, a single unit of system can carry out the disintegration and glue breaking of the granular substances with pollutants adhered continuously and efficiently. However, in the case where plenty of granular substances having large diameters are mixed in the substances to be treated or diameters of them are not so uniform, a better treatment efficiency will be assured by using two units of granulation machines as exemplified by the Embodiment 1.

Embodiment 2

Figure 7:
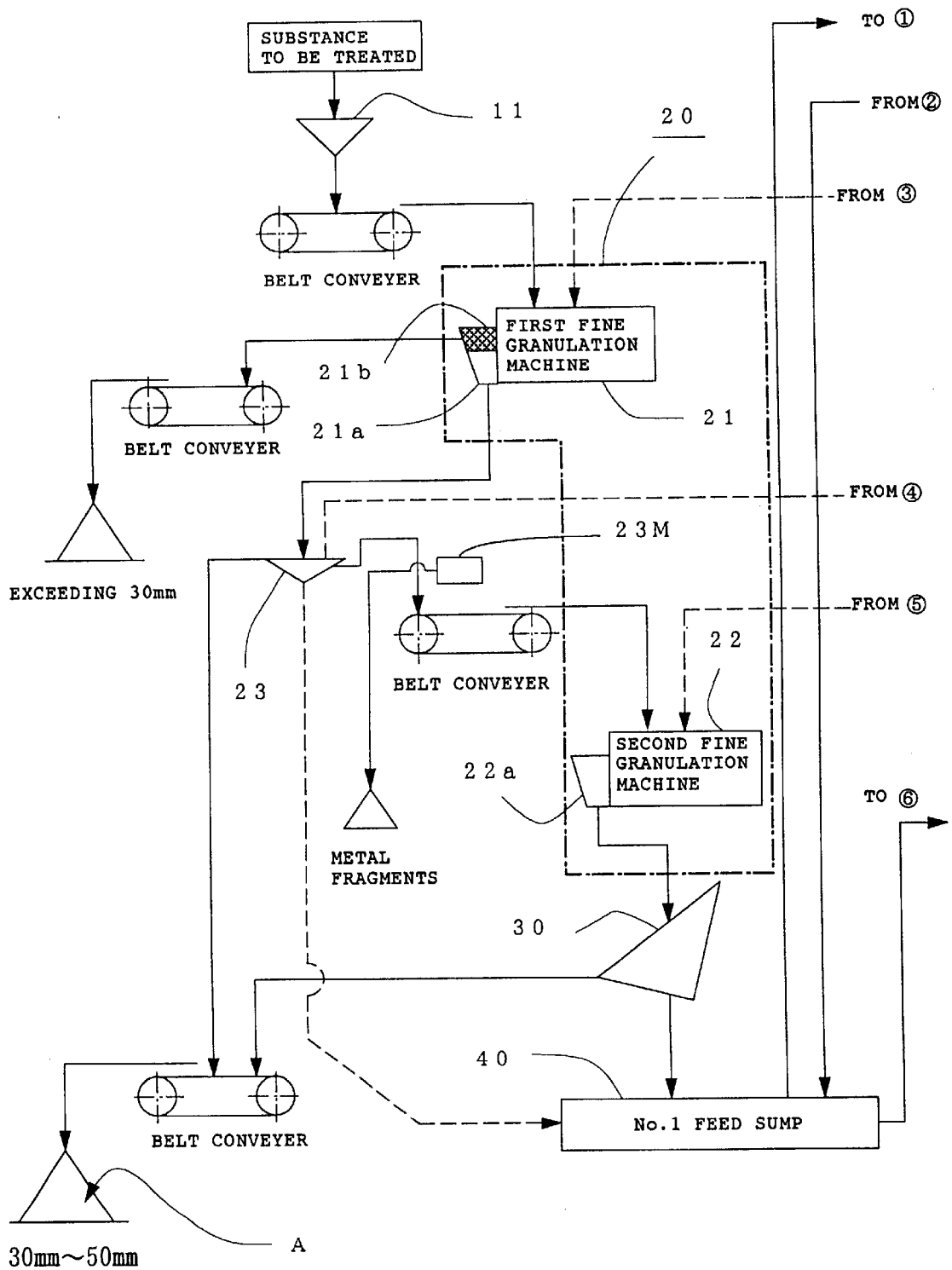
FIG. 7 shows the constitution of the treatment system of the granular substances with pollutants adhered and flow of the treatment according to Embodiment 2.
Figure 8:
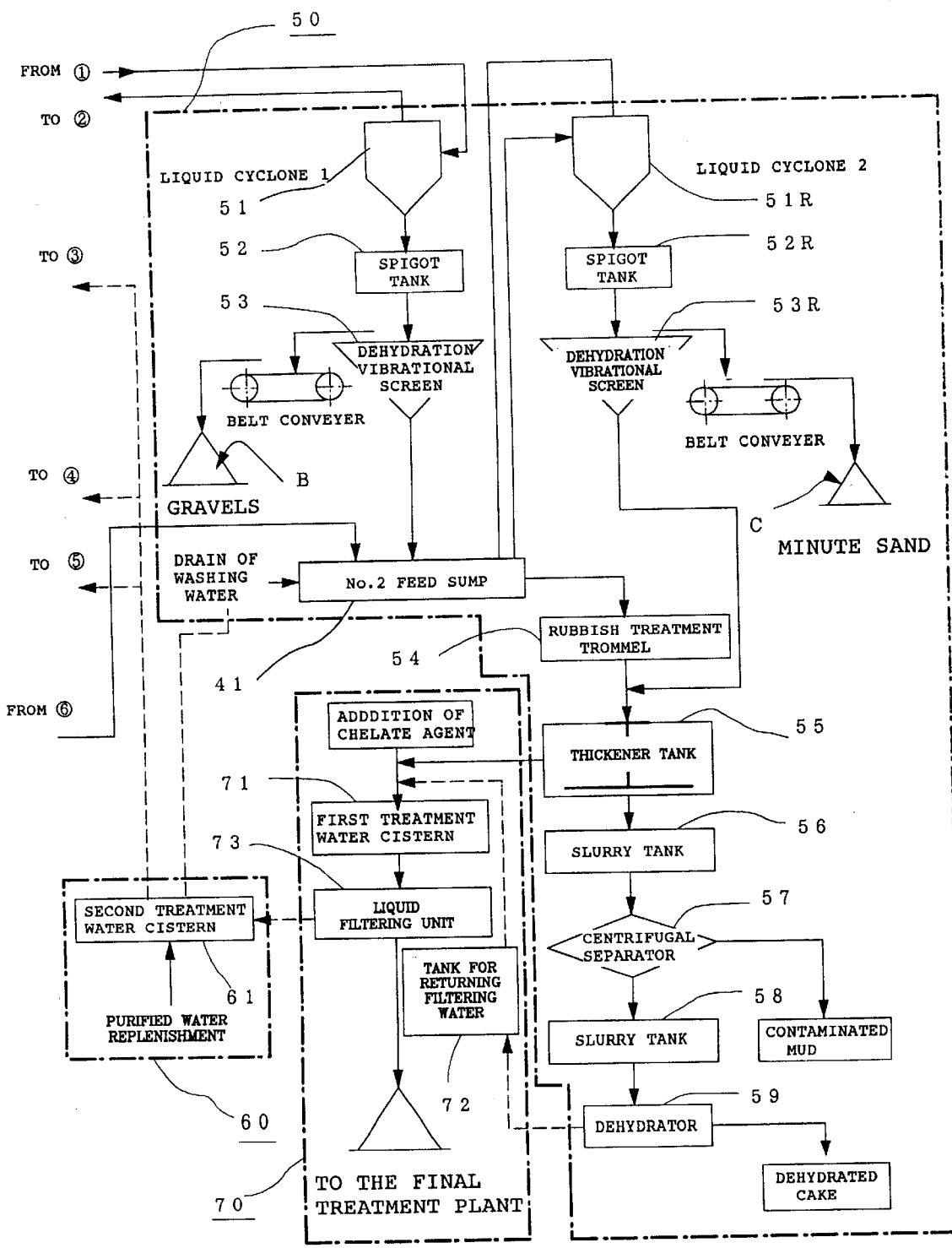
FIG. 8 shows the constitution of the treatment system of the granular substances with pollutants adhered and flow of the treatment according to Embodiment 2.

FIG. 7 and FIG. 8 are charts showing a continuous treatment flow of granular substances with pollutants adhered according to the embodiment 2 of the present invention. This continuous treatment system is arranged based on the system for treatment of the granulated substances with pollutants adhered according to the Embodiment 1: carrying out a continuous treatment on the granular substances with pollutants adhered, which are the poured substances to be treated, so that efficient fine granulation treatment and removal of pollutants adhering to them are carried out and thus discharged unnoxious granular substances are classified and the classified substances are offered for recycling.

In order to carry out the treatment of the finely granulated substances with pollutants adhered efficiently, this treatment system is constructed so that, as shown by FIG. 7, the fine granulation system is arranged in separated two machines of the first fine granulation machine 21 and the second fine granulation machine 22 and, between them, a sorting vibrational screen 23 for separating granular substances having diameters exceeding 10 mm and those one below 10 mm, a magnetic metal exclusion unit 23M for removing metals from the granular substances having diameters below 10 mm separated by the sorting vibrational screen 23 are disposed and thus the arrangement is made so that a limitation is imposed on the maximum diameter of the treatment substances to be poured into the second fine granulation machine 22. Now the admixtures exceeding several cm mixed in the treatment substances to be poured into the fine granulation system 20 are to be removed prior to pour them into the reception hopper 11 and further a classification mesh 21b for trapping large solid substances exceeding about 30 mm is disposed at the discharge port 21a of the first fine granulation machine 21.

Also, as shown by FIG. 8, the classification means 50 of the treatment system is provided with a first liquid cyclone for having granular substances below 100 μm from the granular substances in slurry state suspended in the treatment water and having them separated, a second liquid cyclone for having the same below 20 μm suspended in the treatment water and for having them separated, a thickner tank 55 for bringing the treatment substances in slurry state to be aggregated and deposited by rotating them slowly within the tank 55 and a centrifugal separator and 57 for removing the extra minute fragments such as dioxin class substances.

Also, 40 is a feed sump for storing temporally the slurry containing the granular substances below 5 mm transferred from the vibrational screen 30 and also for supplying substances to be treated to the first liquid cyclone 51; 41 is a second feed sump, i.e. a liquid feeding unit of the second liquid cyclone 51R, installed within the classification means 50.

Further, in the treatment system, the treatment water is circulated: the treatment water is purified through the contaminated water treatment unit 70 and is transferred to the water supply unit 60 and, after this purified treatment water is mixed with clean water for replenishment prepared separately in the second treatment water cistern, it is supplied again to the first fine granulation machine 21, the second fine granulation machine 22 and the sorting vibrational screen 23, etc.

The first cyclone 51 is, as shown by FIG. 10, a classification unit which is operated by utilizing a phenomenon such that, suppose a liquid containing various size of granular substances is injected with a high speed into a inner wall of cylindrical body 511 from the treatment substance introduction pipe 512, then when the liquid moves downwardly along the inner wall of the cylindrical body 511 while forming a vortex V1 called as the first rotational flow, the air pressure at the center portion of the body 511 decreases and thus the liquid goes up from the inside of the first rotational flow V1 in the body 511 while forming a vortex V2 called as a second rotational flow. The granular substances having large diameters contained in the liquid introduce in the cyclones 51 and 52 are forced to move downwardly while colliding with the inner wall of the body 511 due to the first rotational flow V1 and are discharged together with a part of the liquid from the lower discharge port 513S of the substance discharge pipe 513. On the other hand, the granular substances with small diameters are conveyed by the second rotational flow V2, move to upward side of the body, sucked into the ascension pipe 515 and discharged from the upper side of the body 511 and are turned back to unshown feed sum 40 through the transfer pipe 516.

The second liquid cyclone 51R also takes the similar structure to that of the aforementioned liquid cyclone 51 and the granular substances having small diameters discharged from the upper portion of the second liquid cyclone 51R are turned back to the feed sump 41.

Figure 10A:
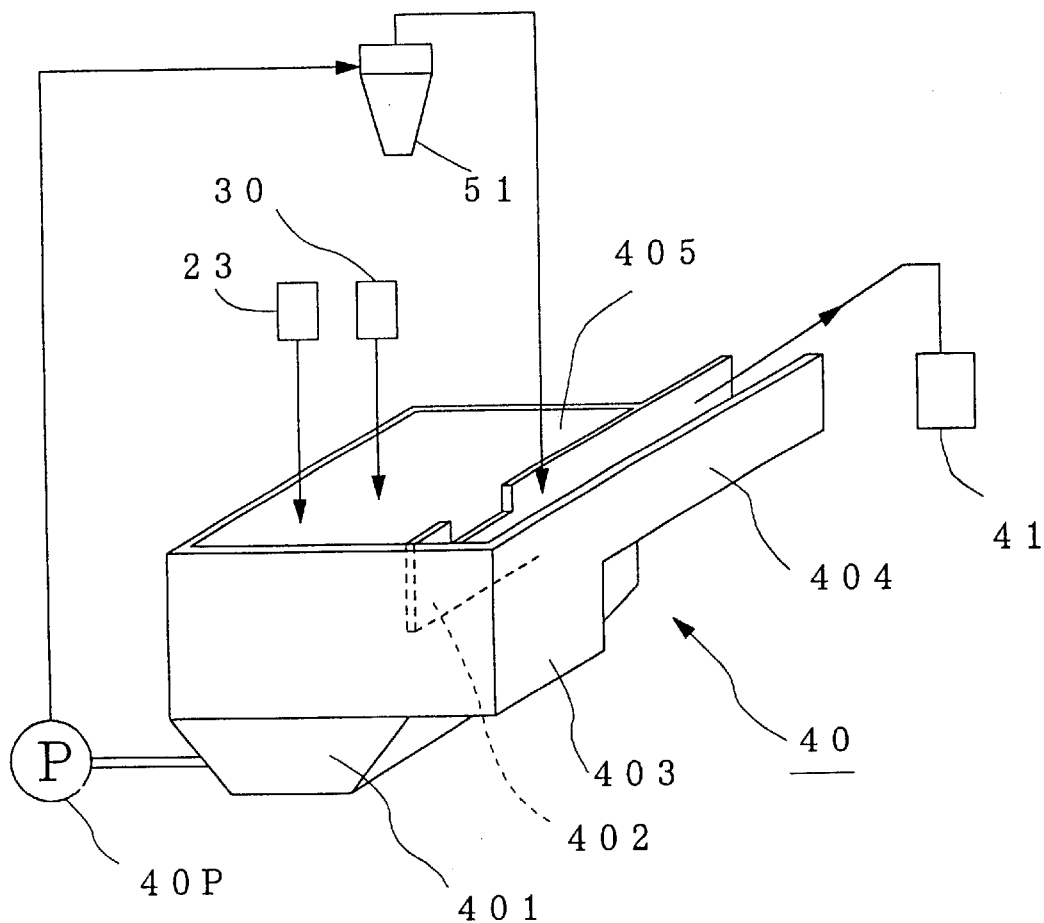
FIGS. 10(a), (b) are a schematic diagram showing the feed sump.
Figure 10B:
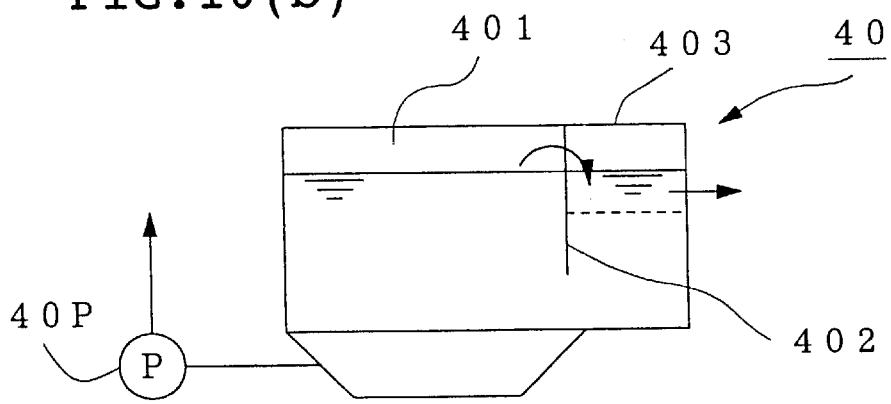

The first feed sump 40 is, as shown by the schematic diagram FIG. 10(a), provided with a feed sump 401 for storing the treatment water from the vibrational screen 23 for sorting muddy substances to be treated containing the granular substances less than 5 mm being supplied from the vibrational screen 30, a partition 402 which communicates with the feed sump 401 at its upper and lower portion, a seal tank 403 for storing the granular substances having small diameters being discharged from the upper portion of the liquid cyclone 51, a transfer pump 40P for transferring forcedly the treatment water containing the granular substances staying at the bottom of the feed sump 401 and an introduction passage 404 for transferring the supernatant liquid to the second feed sump 41. 405 denotes a communication port at upper side of the partition 42 and the supernatant liquid of the feed sump 401 moves, as shown by FIG. 10(b), to the seal tank 403 from the communication port 405 and the supernatant liquid in the seal tank 403 is transferred to the second feed sump 41 through the introduction passage 404. The slurry containing the granular substances with large diameters being stored at the bottom of the feed sump 401 is by means of the pump 40P transferred again to the liquid cyclone 51 and is reclassified.

The structure of the second feed sump 41 is similar to that of the first feed sump 40 and the unshown supernatant liquid of the second feed sump 41 is transferred to the thickner tank 55 through a trommel for removing rubbishes (see FIG. 8)

Next, taking up an example where the substances to be treated are incinerated ashes, a description will be given on the treatment flow of the continuous treatment of the granular substances with pollutants adhered according to the Embodiment 2.

At first, the incinerated ashes poured into the receiving hopper 11 are conveyed to the first fine granulation machine 21 by a belt conveyer. In the first fine granulation machine 21, the treatment water supplied from the second treatment water tank 61, which will be described later, of the water supply unit 60 is added to the incinerated ashes, the incinerated ashes are subjected to a coarse disintegration and the ashes are separated to various sizes and, while having the dioxin class substances and heavy metals adhering to the surfaces of the ashes detached in the state of being suspended or dissolved in the treatment water, the incinerated ashes are moved to the downstream side and discharged from the discharge port 21a of the fine granulation machine.

Since, in the fine granulation machine 21, the gap between the rotary drum 6 and the rotor 7 is wide and the rotational speed is low, solid substances in large size such as metals and admixtures are discharged without disintegrated. These large solid substances are trapped and removed through the mesh 21b for 30 mm classification unit installed at the discharge port 21a and are conveyed by a belt conveyer. On the other hand, the incinerated ashes, which have been reduced to the granular substances below 30 mm, are sieved out by means of the vibration screen 23 for sorting in a level of 10 mm. The sieved out incinerated ashes below 10 mm are transferred to the second fine granulation machine 22 after metal fragments contained in the ashes are removed.

As mentioned above, it is said that the dioxin class substances adhering to incinerated ashes adheres generally to the granular substances below 2 mm and hence the granular substances exceeding 5 mm are supposed to be unnoxious. Accordingly, separated granular substances in the level of 10mm~30 mm through the sorting vibrational screen 23 are available for recycling. Now, water is supplied to the sorting vibrational screen 23 from the water supply unit 60 and the water passing through the sorting vibrational screen is supplied to the first feed sump 40 and is stored temporally therein.

Since incinerated ashes passed through the sorting vibrational screen are reduced to the granulated substances approximately below 10 mm, in the second fine granulation machine 22, by adding water from the water supply unit 60 to the incinerated ashes and by narrowing the gap between the rotary drum 6 and the rotor and by raising the rotational speed, the incinerated ashes are caused to make mutual polishings mainly by mutual frictions of the granulated substances, while detaching the heavy metals and dioxin class substances strongly adhering to the incinerated ashes, the incinerated ashes are moved to the downstream side and they are discharged from the discharge port 22a of the second fine granulation machine 22 and are transferred to the vibrational screen 30.

The above vibrational screen 30 sieves out the granular substances below 5 mm from the incinerated ashes, which have been subjected to the treatment of disintegration and glue breaking by the second fine granulation machine 22 and the incinerated ashes in slurry state containing extra minute granular substances having small diameters such as sands below 5 mm and finely granulated grains of ashes passing through the vibrational screen 30 are stored temporally in the first feed sump 40 and thereafter are classified to granular substances having various sizes by the classification means 50. The granular substances with large diameters mainly consisting of sands, gravels and extra minute fragments of poteries exceeding 5 mm, which are sieved out by the vibrational screen 30, are conveyed by a belt conveyer and then offered to be recycled or abandoned.

Next, the classification treatment through the classification means will be described in detail.

The incinerated ashes containing granular substances below 5 mm in the muddy state stored in the first feed sump 40 is at first transferred to the first liquid cyclone 51 and classified. As aforementioned, in the first liquid cyclone 51, the granular substances below 100 μm are made to be suspended in the treatment water and are separated. The treatment water containing granular substances below 100 μm discharged from the upper side of the first liquid cyclone 51 is stored temporally in the first feed sump 40 and its supernatant liquid is transferred to the second feed sump 41. On the other hand, the slurry containing the granular substances having diameters exceeding 100 μm discharged from the bottom of the first liquid cyclone 51 is, after being transferred to the first spigot tank 52, subjected to separation of the granulation substances mainly consisting of sands exceeding 100 μm through the first dehydration vibrational screen 35 and is transferred to the feed sump 41.

Likewise, incinerated ashes, which have been reduced to the granular substances below 100 μm stored in the second feed sump 41 are classified to the granulated substances mainly consisting of extra minute sands of 20~100 μm and extra minute fragments below 20 μm. This is to say that the treatment water containing extra minute fragments below 20 μm discharged from the upper side of the second liquid cyclone 51R is stored temporally in the second feed sump 41 and its supernatant liquid is transferred to the thickner tank 55 through the rubbish treatment trommel 54. On the other hand, the slurry containing the granular substances exceeding 20 μm in diameters discharged from the bottom of the second liquid cyclone 51R are, after being transferred to the second spigot tank 52R, subjected to separation of the granular substances consisting mainly of extra minute sands exceeding 20 μm in diameters and are transferred to the thickner tank 55.

Now, the granular substances consisting mainly of sands exceeding 100 μm classified by the first dehydration vibrational screen 53 and the same consisting mainly of extra minute sands in the range of 20~100 μm are conveyed by respective belt conveyers and are offered to be recycle or are abandoned.

In the thickner tank, the treatment water containing the granular substances below 20 μm and the incinerated ashes in the state of slurry are rotated slowly and the separation of solid substances and liquid, i.e. the aggregation and deposition of solid substances such as the granular substances, are carried out. As aforementioned, since in the supernatant liquid of the thickner tank, heavy metals separated from the incinerated ashes are dissolved or suspended, the heavy metals are transferred to the first treatment water tank 71 of the contaminated water treatment unit 70 and treated therein. In this treatment tank 71, by rendering the heavy metals to be insoluble by forming a insoluble salt of them through addition of agent such as chelating agent, the heavy metals are separated from the treatment liquid.

On the other hand, the incinerated ashes being deposited on the bottom of the thickner tank 55 are stored temporally in the slurry tank 56 and thereafter are poured into the centrifugal separator 57. In the centrifugal separator 57, extra minute fragments such as dioxin class substances are removed from the incinerated ashes in the state of slurry and the remaining slurry is transferred to the second slurry tank 58 and stored therein. The noxious contaminated mud separated by the centrifugal separator 57 is abandoned through a treatment such as solidification through fusion. On the other hand, since the slurry stored in the second slurry tank 58 is brought to be unnoxious through removal of heavy metals and dioxin class substances, the slurry is transferred to the dehydrator 59 and is allowable to bring to recycling by treatment such as making dehydrated cake by means of unshown filter press.

The dehydrated water by the dehydrator 59 is transferred to the tank 72 for returning filtering water and stored temporally therein. Subsequently, after making the heavy metals insoluble in the first treatment water tank 71, the dehydrated water is transferred to the liquid filtering unit 73 and in this unit 73, the treatment water is purified by removing the heavy metals and dioxin class substances through adsorbent such as activated carbon and thus purified treatment water is transferred to the second treatment water tank 61 of the water supply unit. Also the treatment water transferred to the first treatment water cistern 61 too, after being purified by the liquid filtering unit 73, is transferred to the second treatment water cistern 61. The treatment water returned back to the second treatment water cistern 61 is mixed with the clean water for replenishment and is supplied again to the first granulation machine 21, the second granulation machine 22 and the vibrational screen for sorting 23, etc.

Figure 12:
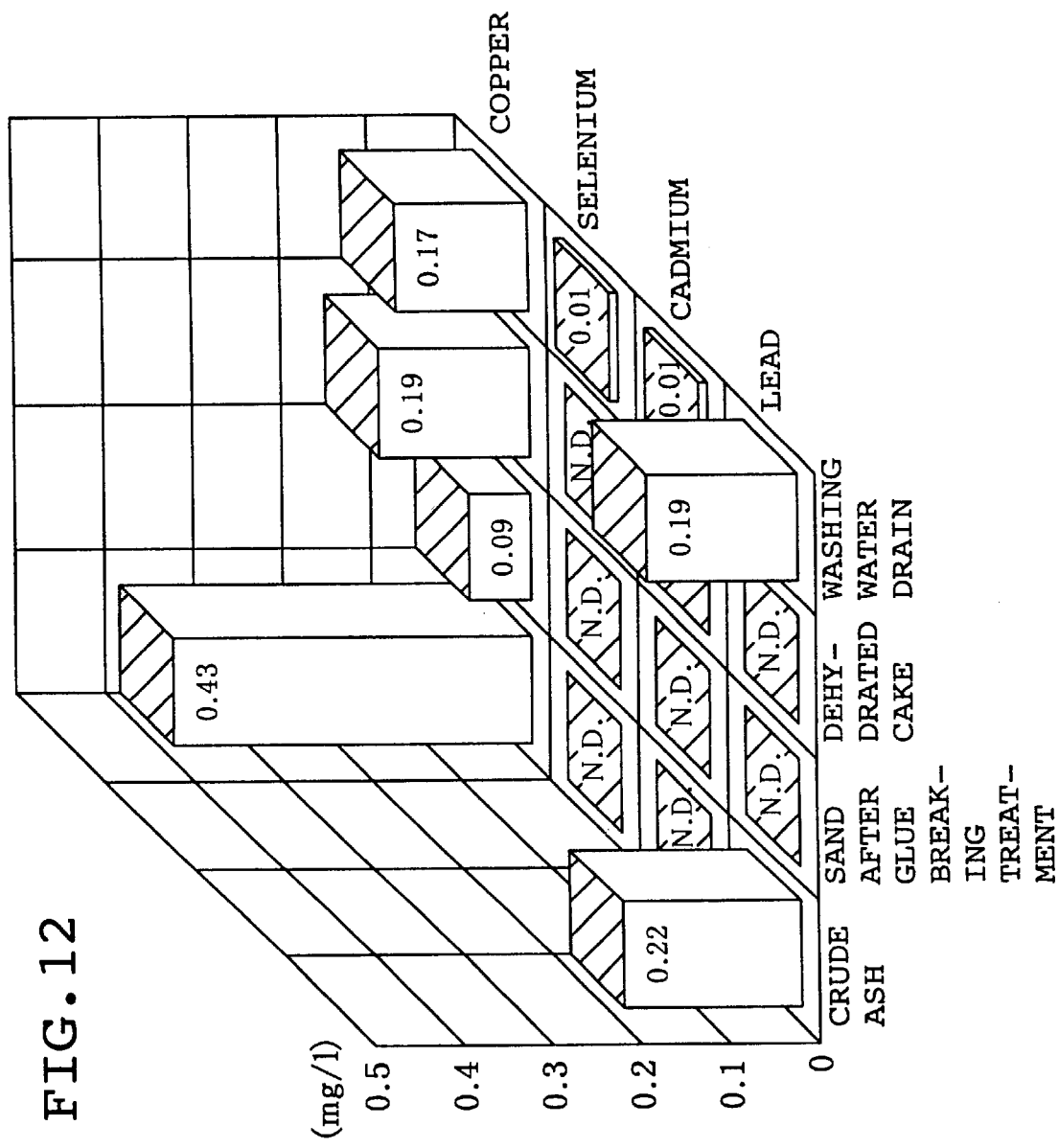
FIG. 12 is a table showing result of the analysis of the incinerated ashes which is subjected to the treatment by the continuous treatment according to Embodiment 2.

FIGS. 11~13 show results of analyses of the incinerated ash being subjected to the treatment of the continuous treatment system according to the Embodiment 2: FIG. 11 is a table showing the result of the elution test of the heavy metals, FIG. 12 shows part of the test by means of the bar graph, FIG. 13 shows result of the dioxin class substances concentration measurement.

As clearly shown by FIG. 11 and FIG. 12, noxious heavy metals such as lead, cadmium, selenium and the like are not detected from the sand constituents, which have been subjected to the treatments of disintegration and glue breaking through the present treatment system, and the extra minute amount (1/300 of the standard value) of copper is also reduced to about 1/5. Also noxious heavy metals such as lead, cadmium, selenium, etc. are not detected from the dehydrated cake made of extra minute fragments less than 20 μm. On the other hand, from the drained wash water, not only about 86% of lead contained in the source ashes but cadmium and selenium too, being in the level of the standard value, were detected. This shows the fact that, during the treatment process of the incinerated ashes, the heavy metals adhering to the incinerated ashes ware eluted or suspended in the treatment water, and this tells the fact that separation heavy metals from the incinerated ashes are certainly carried out through the treatment of disintegration and glue breaking.

As shown by FIG. 13, though dioxin class substances are detected from the incinerated ashes in slurry state (sedimentary muddy soil in the drawing) discharged from the thickner tank 55, they hardly adhere to the granular substances exceeding 5 mm (gravels in the drawing) or to the same (sands) below 5 mm and thus it is understand that separation of the dioxin class substances was carried out sufficiently and thus those unnoxious granular substances are allowed to be recycled. Also considering the fact that the dioxin class substances are detected to some extent in the water (the supernatant water of the drawing) drained from the thickner tank 55, it is supposed that, though the most part of the dioxin class substances exfoliated from the incinerated ashes during the glue braking process is contained in the slurry state incinerated ashes as extra minute fragments and yet, part of them are reduced to extra minute powders and they are suspended in the treatment water.

Accordingly, classified granular substances, dehydrated cake, metal fragments and the like exceeding 5 mm and below 5 mm can be made to resources available for recycling. On the other hand, muddy soils containing separated heavy metals and dioxin class substances can be subjected to treatment of solidification through fusion and can be buried in the final treatment plant and therefore reduction of volume of muddy soil and rendering the same to unnoxious can be realized certainly. Also, by making dehydrated cakes through the dehydration treatment of the muddy soil, solidification through fusion can be easily carried out and volume reduction of the incinerated ashes can be enhanced further.

Though in the Embodiment 2, the case where the granulation substances, which are subjected to the disintegrating and the glue breaking treatments by the fine granulation system 20, are classified by the liquid cyclone 51 and 51R is exemplified, but it is also possible to carry out classification treatment upon simplifying the treatment system by using a single unit of the liquid cyclone. Also in the treatment system mentioned as above presentation of the structure of the classification means 50 and that of the contaminated water treatment unit 70 are simplified and also water circulation is deleted.

Now, the liquid cyclone 51Z is adapted to separate the extra minute grains below about 50 μm in the treatment water, upon having that extra minute grains suspended in the treatment water, and the treatment water containing that extra minute grains is turned back to the feed sump 40 through unshown transfer pipe and, after temporally storing the slurry containing plenty of slurry consisting mainly of granular substances having large grain diameters discharged from the bottom portion of the liquid cyclone 51Z in the spigot tank 52, the granular substances (extra minute sands) consisting mainly of sands exceeding 50 μm are separated by the dehydration screw 53Z and the slurry subjected to the foregoing separation is turned back to the unshown seal tank of the feed sump 40. Also the supernatant liquid of the feed sump 40 is transferred to the thickner tank 55.

In this way, by returning the treatment water, which contains extra minute fragments classified by the liquid cyclone 51Z, together with the treatment water, from which the minute sands has been removed by the dehydration vibrational screen, to the feed sump 40 and by classifying again the slurry containing granular substances with large diameters being stored in the bottom of the feed sump 40 and also by transferring the supernatant liquid of the feed sump 40 to the thickner tank 55, the treatment water containing only the extra minute fragments can be supplied to the thickner tank 55. Also in the Embodiment 2 too, the classification of the granular substances can be carried out more certainly if an arrangement is made so as to turn back the treatment water, from which minute sands have been removed by means of the dehydration vibrational screen 53, to the feed sump 40 and transfer supernatant liquid of the feed sump 40 to the second feed sump 40.

In the example as above, though a description is made on the case where the substances to be treated are incinerated ashes, it is needless to say that, for the treatment of the contaminated soils too, a similar treatment system to the one as above enables to remove efficiently the pollutants adhering to the soil grains.

Furthermore, stones, sands, extra minute grains, etc. contained in the contaminated soils as above can be extracted and offered to recycling.

Embodiment 3

Figure 15:
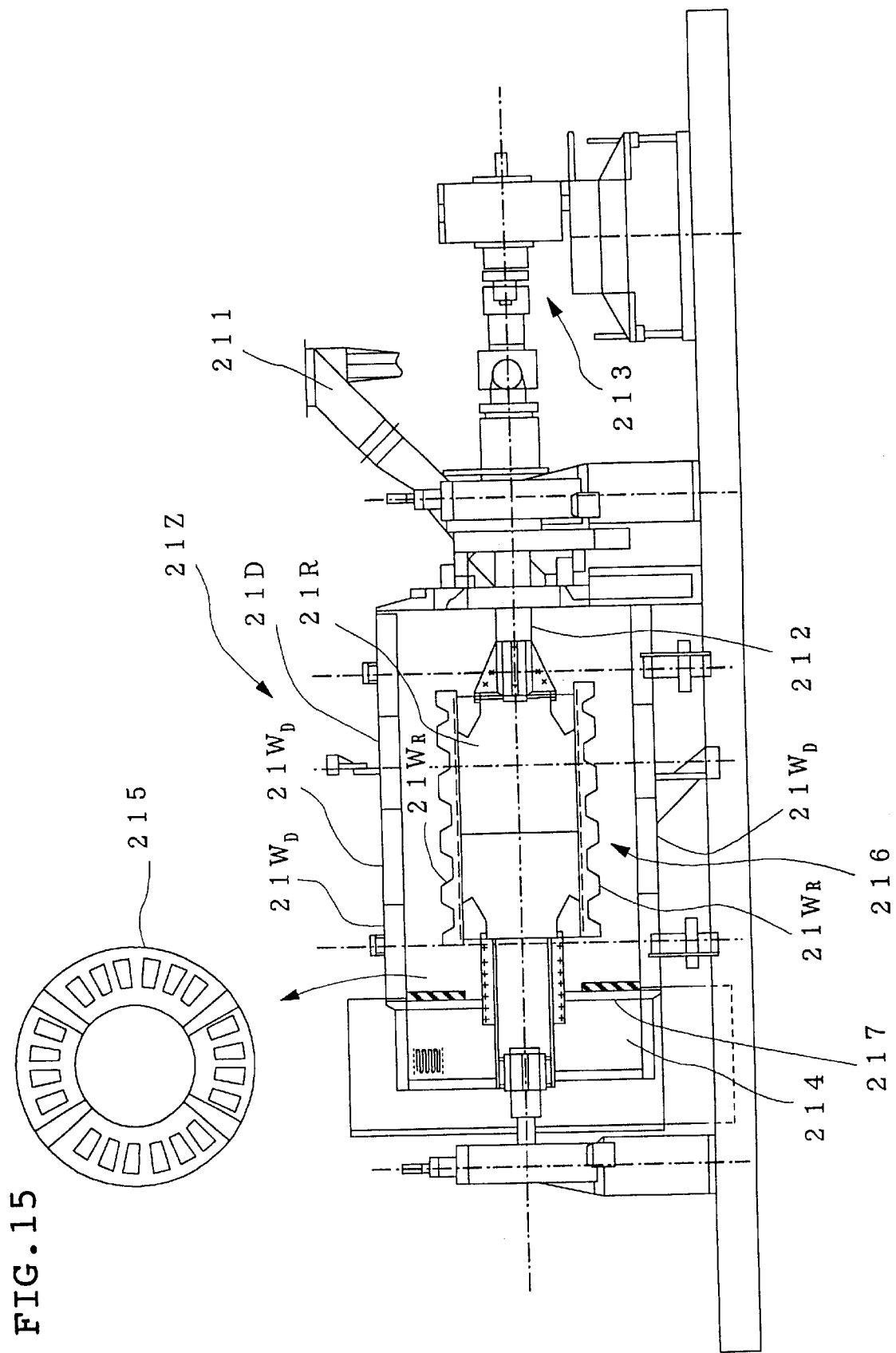
FIG. 15 shows the constitution of the first fine granulation machine according to Embodiment 3.
Figure 16:
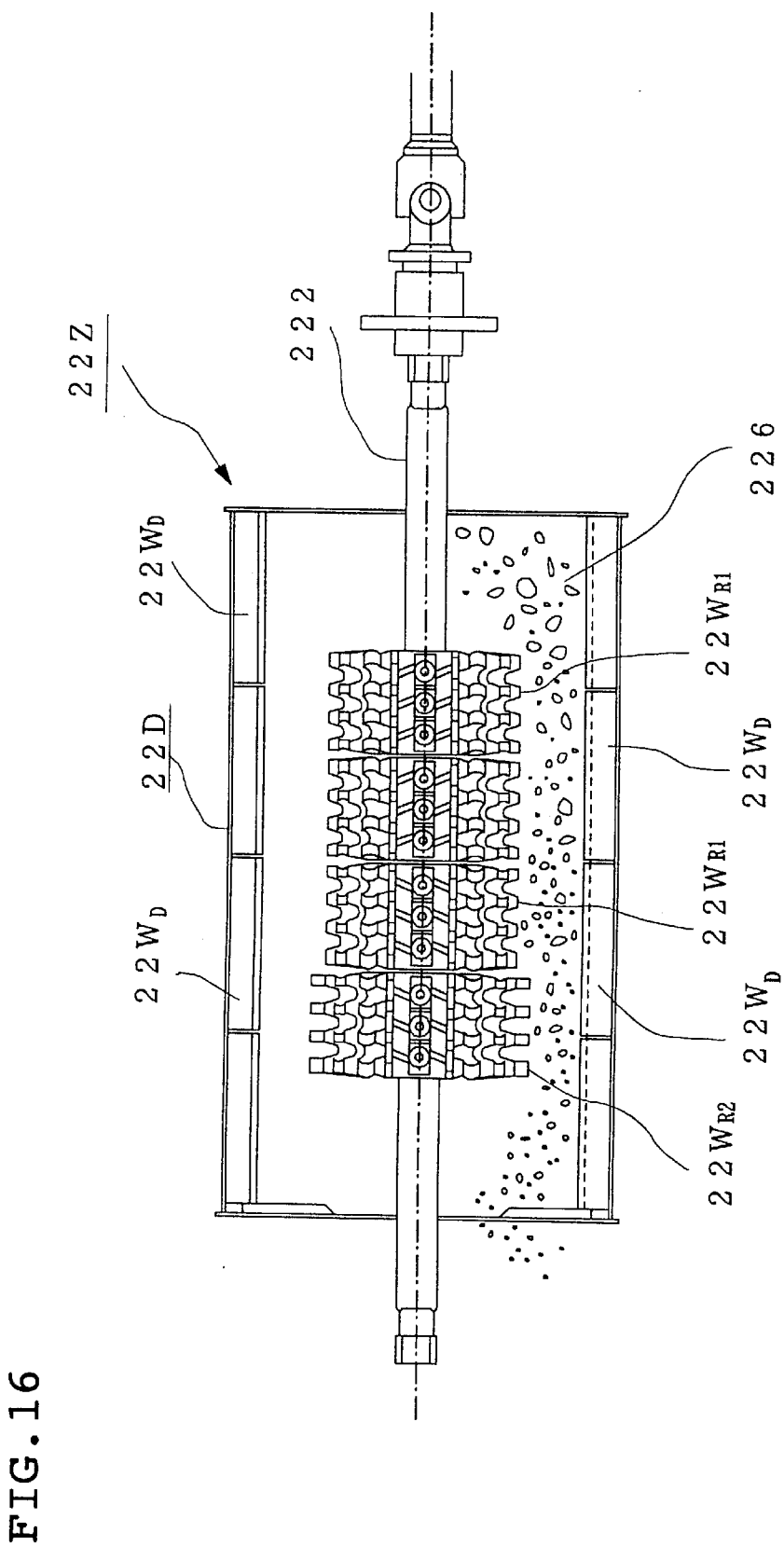
FIG. 16 shows the constitution of the second fine granulation machine according to Embodiment 3.

Though the fine granulation means in the Embodiments 1 and 2 are adapted to have larger stresses exerted on the granular substances with pollutants adhered in the second fine granulation machine 22 than in the first fine granulation machine 21 by narrowing the gap between the rotary drum 6 and the rotor 7 by increasing the amount of eccentricity of the rotor 7 and by raising the rotational speed, and yet treatment of disintegration and glue breaking of the granular substances can be further certainly carried out by increasing the stresses exerted on the granular substances on the downstream side which is realized by employing the fine granulation system being provided with the first fine granulation machine 21Z and the second fine granulation machine 22Z having constructions as shown by FIG. 15 and FIG. 16, respectively.

This is to say that the first fine granulation machine 21Z is, as shown by FIG. 15, provided with a cylindrical rotary drum 21D having a plurality of outer blades $21W_D$ being attached to inner peripheral surface in axial direction and projecting toward center and a rotor 21R having a plurality of inner blades $21W_R$ being attached to outer peripheral surface in axial direction and being installed eccentrically with respect to the rotary drum 21D within it. Also, those drawings show that 211 is a treatment substances pouring chamber, 212 is a rotary shaft of the rotor 21R, 213 is a driving unit of the rotary shaft, 214 is a treatment substance discharging chamber, 215 is a liner slit consisting of a plurality of slits having width of 5~20 mm formed on an annular flat plate which is provided on a partition 217 between a treatment chamber 216 consisting of the rotary drum 21D and the rotor 21R and the treatment substance discharging chamber 214. Now, an annular gear arranged on the periphery of the rotary drum 21D and a driving motor for driving the annular gear are deleted.

FIG. 16 shows construction of a main part of the second fine granulation machine 22 and its fundamental construction is approximately the same with that of the first fine granulation machine 21Z. In this drawing, 22D is a cylindrical drum having a plurality of outer blades $22W_D$, 22R is a rotor being provided with a plurality of inner blades $W_{R1}$, and $W_{R2}$ and being installed eccentrically with respect to the rotary drum within it, 221 is a treatment substance pouring chamber and 222 is a rotational shaft of the rotor 22R. Now, the inner blades $22W_{R1}$ and $22W_{R2}$ stand for the upstream side inner blades and downstream side ones, respectively.

Figure 17A:
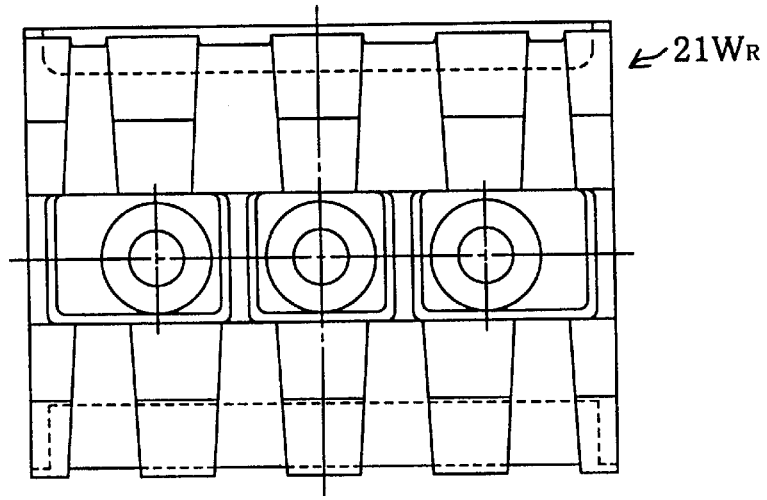
FIGS. 17(a), (b) and (c) show in detail the inner blades of the first fine granulation machine according to Embodiment 3.
Figure 17B:
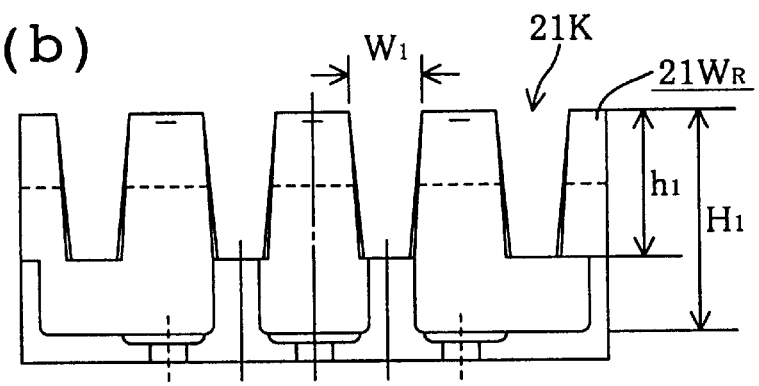
Figure 17C:
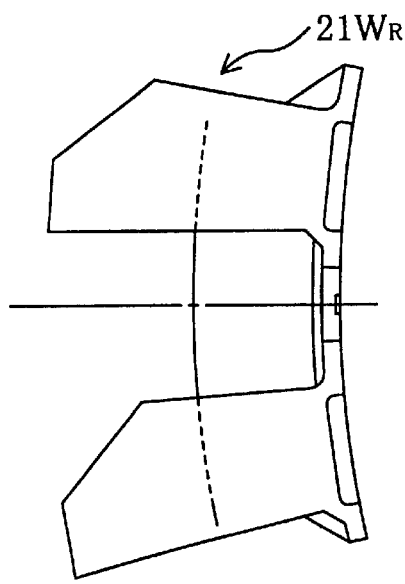
Figure 18A:
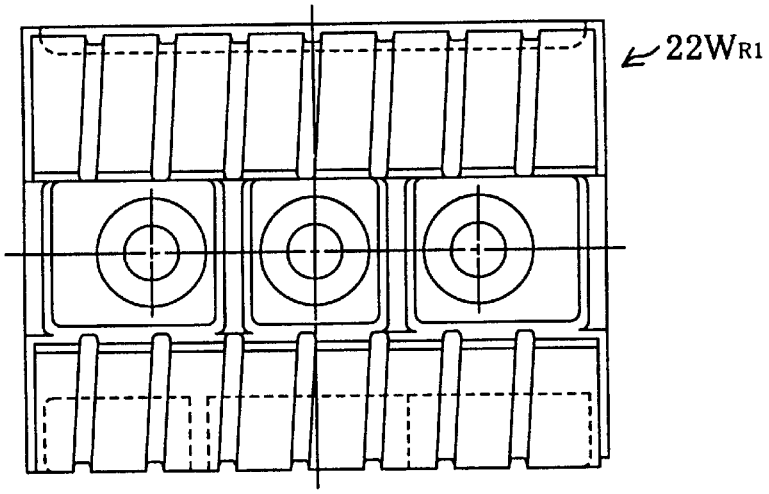
FIGS. 18(a), (b) and (c) show in detail the inner blades on the upstream side of the second fine granulation machines according to Embodiment 3.
Figure 18B:
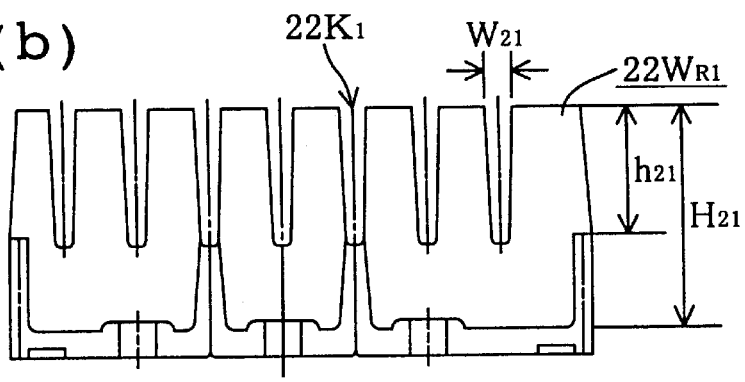
Figure 18C:
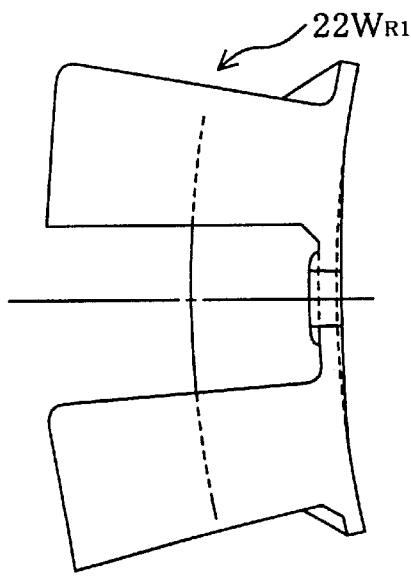
Figure 19A:
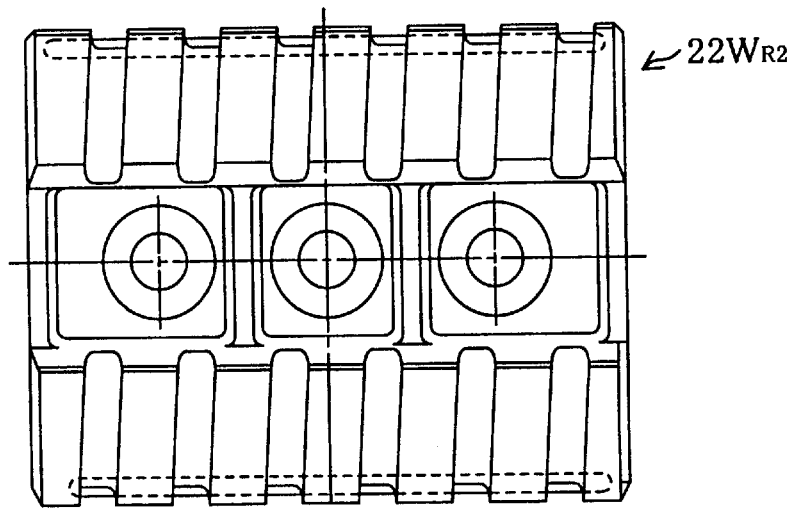
FIGS. 19(a), (b) and (c) show in detail the inner blades on the downstream side of the second fine granulation machine according to Embodiment 3.
Figure 19B:
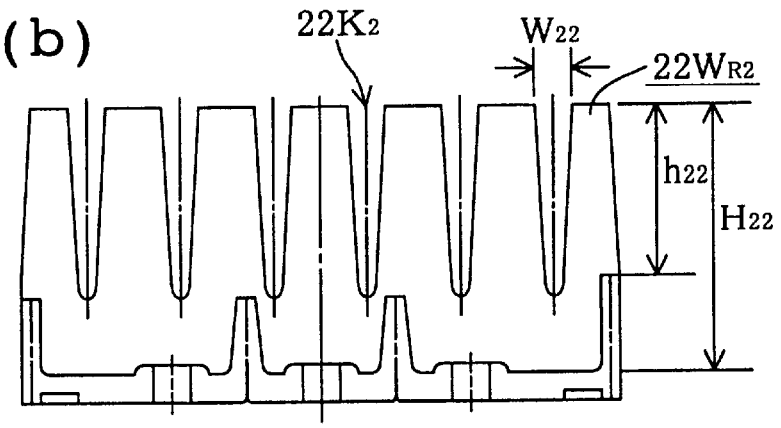
Figure 19C:
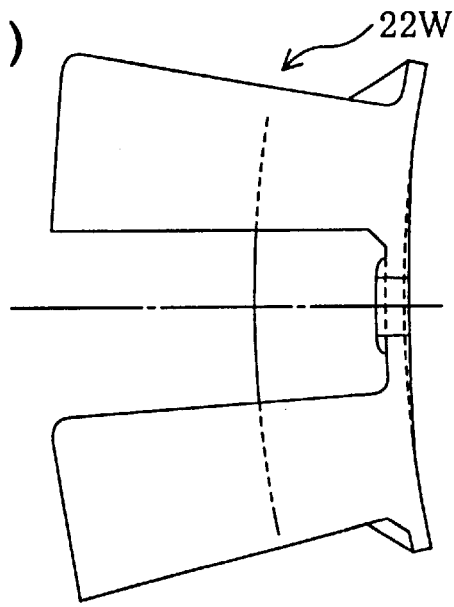

FIG. 17 shows in detail the inner blades $21W_R$ of the first fine granulation machine 21Z and FIG. 18 and FIG. 19 show the inner blades $22W_{R1}$ and 22 $W_{R2}$ on the upstream side and on the downstream side, respectively of the second fine granulation machine 22Z and in respective those drawings (a) is plan view, (b) is a front view and (c) is a side view. As shown by FIGS. 17–19, the inner blades $21W_R$ of the first fine granulation machine 21Z and the first blades $22W_R$ of the second fine granulation machine 22Z are provided with a plurality of groves 21K or $22K_1$, $22K_2$, respectively, which have approximately U-shaped sectional planes, being in parallel to the shaft of the rotor 21R or that of the rotor 22R with a predetermined gap provided. The width $W_{21}$, $W_{22}$ of the grooves $22K_1$, $22K_2$ being provided in the inner blades $22WK_{R1}$, and $22WK_{R2}$ of the second fine granulation machine 22 are made narrower than the width $W_1$ of the grooves 21K provided in the inner blades $21W_R$ of the first fine granulation machine 21.

In the second fine granulation machine 22Z, height $H_{22}$ of the downstream side inner blades $W_{R2}$ is made higher than the height $H_{21}$ of the upstream side inner blades $22W_{R1}$ and the depth $h_{22}$ of the downstream side grooves $22k_2$ is made deeper than the depth $h_{21}$ of the upstream side grooves $22K_1$. Also the height $H_1$ of the inner blades $W_{R1}$ of the first fine granulation machine 21Z is designed to be approximately equal to the height $H_{21}$ of the upstream side inner blades $22W_{R1}$ of the second fine granulation machine 22Z, and the width $W_{21}$ of the grooves $22K_1$ of the upstream side inner blades $22W_{R1}$ of the second granulation machine 22 is designed to approximately equal to the width $W_{22}$ of the grooves $22K_2$ of the downstream side inner blades $22W_{R2}$ of the second fine granulation machine 22.

The outer diameter $R_2$ of the rotor 22R of the second fine granulation machine is, as shown further by FIGS. 20(a), (b) are set to lager than outer diameter $R_1$ of the rotor 21R of the first fine granulation machine 21 and the treatment gap of the second fine granular machine 22Z is made narrower than that of the first fine granular machine 21Z. Also, the outer diameter of the portion of the rotor 22R, at which the downstream side blades $22W_{R2}$ are provided with, is made larger a little than that of the portion, at which upstream side inner blades $22W_{R1}$ are provided, so that the inner blades $22W_{R2}$ is designed to impose a limitation on its height $H_{22}$.

The rotation speed (relative rotation speed of the rotary drum 22R and the rotor 22D) of the second granulation machine 22Z is made higher than that of the first granulation machine 21Z and the pressure $P_2$ exerted on treatment substances S within the treatment gap of the second granulation machine 22Z is larger than the pressure $P_1$ exerted on the treatment substances S of the first granulation machine 21Z so that the mutual collision speeds among each granular grains of the treatment substances S become large.

Figure 21:
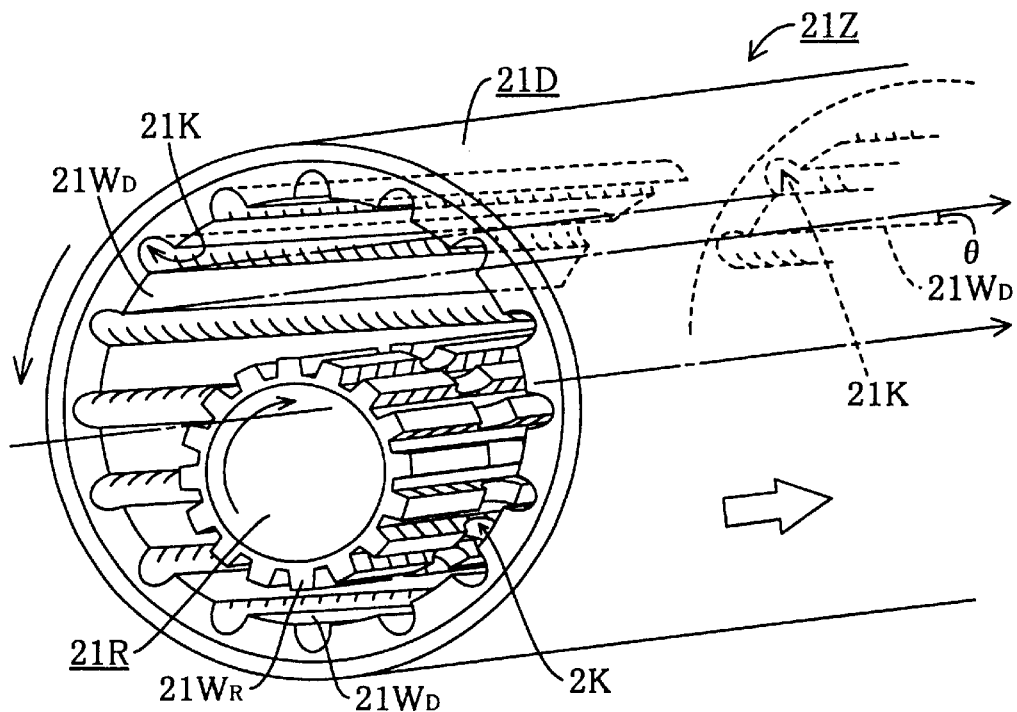
FIG. 21 shows constitution of the outer blades of the first fine granulation machine.

The outer blades $21W_D$ and $22W_D$ in the first fine granulation machine 21Z and the second fine granulation machine 22Z respectively, are as shown by FIG. 21, arranged with some downward inclination (θ~approximately 3 degrees) and, by this arrangement, the treatment substances poured into the treatment gap between the rotary drums 21D, 22D and the rotors 21R, 22R are made to be moved in downstream direction (FIG. 21 shows an example of the first fine granulation machine 21Z).

Since the rotational speeds of rotor 21R, 22R are usually set faster than those of the rotary drums 21D, 22D, the treatment substances poured into the treatment gap are transferred through the space of the treatment gap, along the grooves 21K, $22K_1$, $22K_2$ of the inner blades $21W_{R1}$, $22W_{R1}$, $22W_{R2}$ and along the outer blades $21W_D$ and $22W_D$ being attached with a downward inclination and accompanied with a upward or downward motion along the direction of rotation of the rotor 21R, 22R, to the downstream side. Accordingly, since in the second fine granulation machine 22Z, which employs narrow width $W_{21}$, $W_{22}$ of the grooves $22K_1$, $22K_2$ of the inner blades $22W_{R1}$, $22W_{R2}$, a larger resistance against the movement of the treatment substances toward downstream side is acted than in the first fine granulation machine 21Z, the treatment efficiency is higher in the second granulation machine than in the first fine granulation machine.

Figure 22:
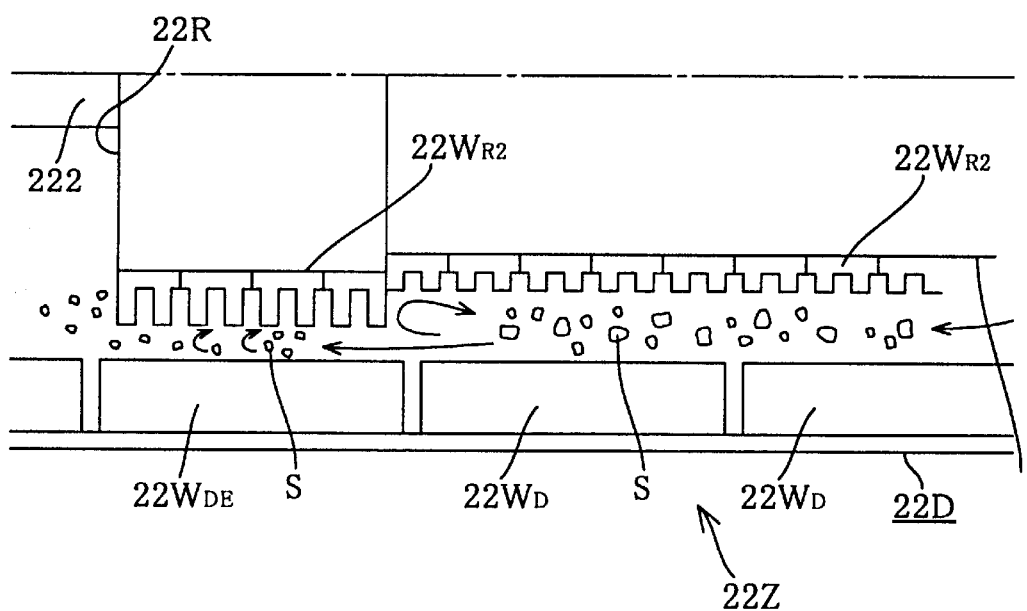
FIG. 22 shows constitution of the outer blades of the second fine granulation machine.

Also in the second fine granulation machine 22Z, as shown by FIG. 22, among the outer blades $22W_D$, attachment of the most final stage of the outer blades $W_{DE}$ located in a narrow treatment gap is made, contrary to the other remaining outer blades, with an angle upwardly inclining a little (θ~2degrees) with respect to the rotation shaft of the rotary drum 22 so that the treatment substances are subjected to a reversal flow and thus efficiency of the glue breaking is improved.

Next, description on the operation of the granulation system which is provided with the first fine granulation machine 21Z and the second fine granulation machine 22Z will be given.

At first, treatment substances S such as contaminated soils and incinerated ashes are poured into the treatment substance pouring room 211 of the first fine granulation machine 211 from the receiving hopper 11 and also treatment water is supplied inside the first fine granulation machine 21. In the first fine granulation machine, not only the pressure exerted on the granular substances is low due to a relatively wide gap between the rotary drum 21D and the rotor 21R but also because the width $W_1$ of the grooves 21K of the inner blades $21W_R$ is made wide and also because the rotational speed is low, mainly disintegration of masses with large diameters and glue breaking of solitary granular substances with large diameters are carried out.

Accordingly, the treatment substances S poured into the first granulation machine 21Z are transferred to downstream side while they are separated to independent individual granular substances. The pollutants adhering to the surfaces of independent individual granular substances are exfoliated and separated from those individual granular substances. The granular substances, which are reduced to below 10 mm through fine granulation out of the granular substances transferred to the downstream side of the first fine granulation machine 21Z, are discharged together with the water outside the machine from the each slit of the liner slits 215 provided to the partition 217 through the treatment substance discharge chamber 214. Also though a part of the granular substances having relatively large diameters exceeding 10 mm are discharged to the treatment substance discharge chamber 214 from center portion of the liner slits 215, most of the granular substances having large diameters just as above are turned back to the treatment chamber 216 of the first fine granulation machine 21Z. This is to say that, by installing the liner slits 215, resistance against the relatively large granular substances can be made large and thus disintegration efficiency within the first granulation machine 21Z can be improved.

In the second fine granulation machine 22Z, by making the width $W_{21}$, $W_{22}$ of the grooves $22k_1$, $22k_2$ of the inner blades $22W_{R1}$, $22W_{R2}$ narrower than the width $W_1$ of the grooves 21K of the inner blades $21W_R$ of the first granulation machine 21Z, by narrowing the gap between the rotary drum 22D and the rotor 22R by making large the diameter of the rotor and also by forming the depth $h_{22}$ of the grooves $22K_2$ of the downstream side inner blades $22W_R$ deeper than the depth $h_{21}$ of the upstream side, the treatment gap on the downstream side is further narrowed so that the glue breaking of the treatment substances becomes to possible. Further, by changing the attachment angle of the outer blades 41Z upwardly on the downstream side, the treatment substances are subjected to a reversed flow so that the glue breaking treatment can be carried out sufficiently. In addition, due to the stepwise change of the treatment space at the boundary of the upstream side inner blades $22W_{K1}$ and the downstream side inner blades 22 $W_{R2}$, part of the treatment substances are turned back again to the side of the inner blades $WR_1$ and stay there, and the glue breaking treatment of them are further advanced.

In this way, in the second fine granulation machine 22Z, the fine granulation of the treatment substances are further proceeded and, through the glue breaking treatment, pollutants, such as heavy metals, adhering to the surface of each of the granular substances can be separated efficiently from the granular substances by frictional forces acted on them.

Since the pollutants such as separated heavy metals have extremely small diameters they are dissolved or suspended in the treatment water.

Embodiment 4

Figure 23:
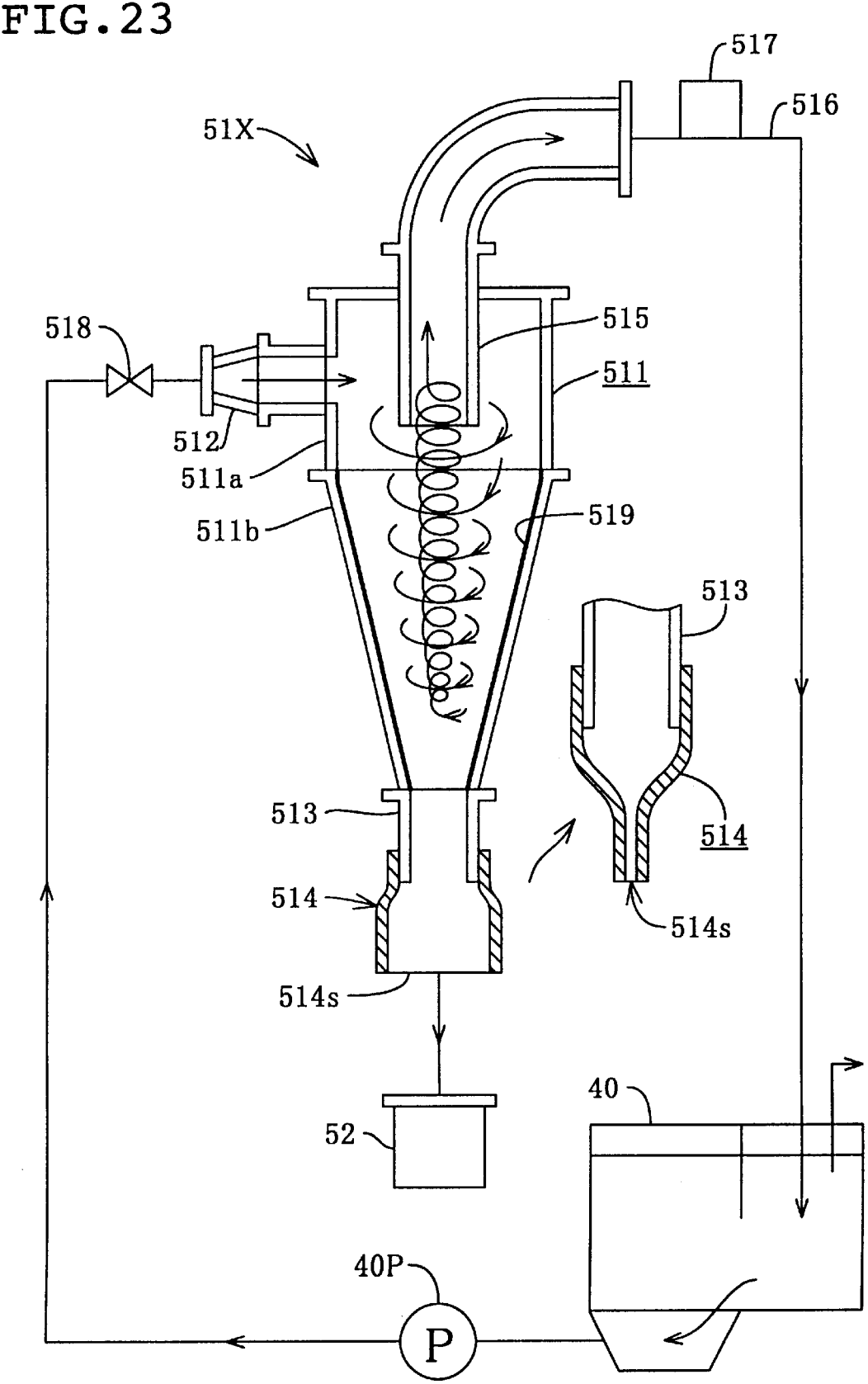
FIG. 23 is a schematic diagram showing the constitution of the negative pressure type liquid cyclone according to Embodiment 4.

Though in the Embodiment 1 and 2, a common liquid cyclone is used as a means for classifying the treatment substances in the slurry state containing granular substances below 5 mm, which were subjected to the disintegration and glue breaking treatments by the fine granulation system 20 and were transferred from the vibrational screen 30, it is also possible to improve the classification efficiency further by using a liquid cyclone of a negative pressure type, in place of the common type liquid cyclone, whose discharge pressure is increased by installing a nozzle consisting of an elastic body at the discharge port provided at a lower portion of the liquid cyclone body. FIG. 23 shows a construction of a liquid cyclone of a negative pressure type 51X. In the drawing, 511 is a cylindrical cyclone body constructed such that the inner diameter is made to become narrow gradually on the down stream side; 512 is a treatment substance introduction pipe installed on the wall of the body 511 on the side of the upper portion of 511a; 513 is a treatment substance discharge pipe provided at a tip portion of the lower portion 511b of the body 511; 514 is a spigot nozzle made of rubber attached to the treatment substance discharge pipe 513; 515 is an ascension pipe installed almost at a center portion of the upper portion of the body 511, 516 is a transfer pipe for turning back the treatment water containing the granular substances having small diameters discharged from the ascension pipe 515 to the feed sump 40, 517 is a discharge pressure adjustment means for carrying out adjustment of the discharge pressure of the negative pressure liquid cyclone by introducing air within the transfer pipe 516 provided on the transfer pipe 516 on the side of the ascension pipe 515, 518 is an introduction quantity adjustment valve for carrying out the adjustment of quantity of treatment substances to be introduced which is to be transferred to the negative pressure type liquid cyclone 51X installed at a preceding stage of a treatment substance introduction pipe 2, 519 is a shock absorbing rubber affixed on the inner wall of the lower portion 511b of the body 511.

Figure 9:
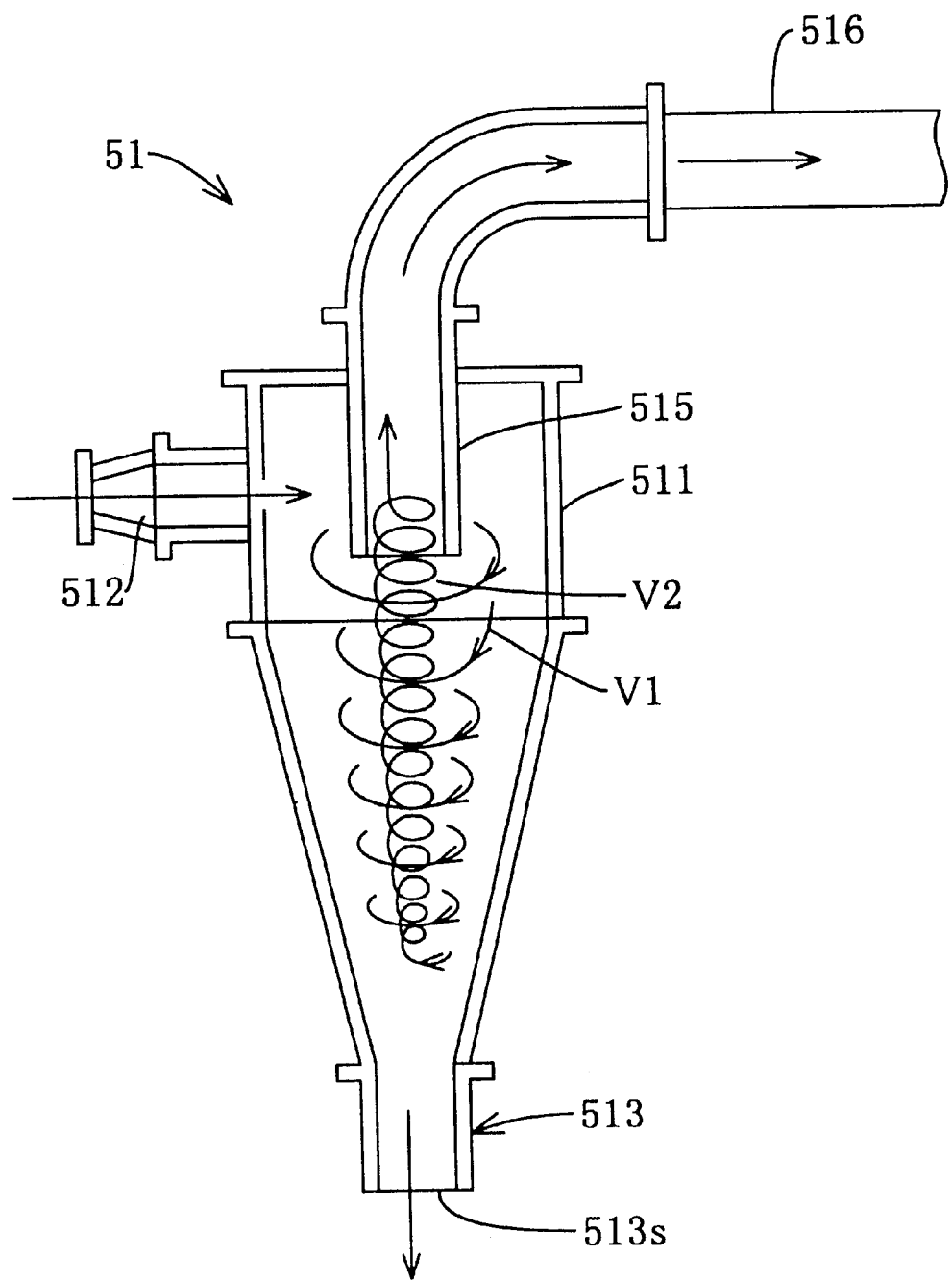
FIG. 9 is a schematic diagram showing the constitution of the liquid cyclone.

The common liquid cyclone is, as mentioned above, arranged to have the extra minute granular substances having small diameters contained in the liquid introduced moved upward direction of the body 511 by means of the second rotational flow and to discharge them from an upper portion of the body 511 through the ascension pipe 515 and also to discharge the granular substances having large diameters contained in the liquid together with a part of the liquid from the lower portion discharge port 513S of the treatment substance discharge pipe 513 (see FIG. 9).

Against that common liquid cyclone, the negative pressure type liquid cyclone 51 is, as shown by FIG. 23, arranged to attach a spigot nozzle 514 consisting of an elastic body to the treatment substance discharge pipe 513, and due to this arrangement, at the time of the operation of the negative pressure type liquid cyclone because of reduction of the inner air pressure of the body 511 as mentioned above, the spigot nozzle is sucked and squeezed and thus the opening port 514S of the spigot nozzle 514 is closed. Accordingly, the negative pressure at the lower portion of the body 511 is increased and the second rotational flow is generated easily and thus the granular substances with small diameters can be efficiently transferred to the ascension pipe 515 and also the treatment water can be prevented from flowing out from the opening port 514S of the spigot nozzle serving as a discharge port of lower portion.

The muddy water containing the granular substances with large diameters, which have moved downwardly while colliding with the inner wall of the body 511 due the first rotational flow, is transferred to inside of the spigot nozzle 514 from the treatment substance discharge pipe 513 and the solid constituents in the muddy water are accumulated in the vicinity of opening port 514S of the spigot nozzle; when the solid constituents are accumulated exceeding a predetermined quantity, considering the fact that the spigot nozzle consists of an elastic material, the opening port 514S of the spigot nozzle 514 is widened due to the pressure by the weight of the accumulated solid constituents and thus the slurry containing the increased solid constituents is discharged from the opening port 514S. Accordingly, from the opening port 514S of the spigot nozzle 514, not the muddy water containing the treatment water with a high percentage as seen heretofore, but slurry containing plenty of solid constituents consisting of the granular substances having large diameters is discharged. Now, supposed that the discharge port of the lower portion mentioned as above is arranged to perform opening or closing mechanically at every predetermined time, and still it is possible to discharge the slurry containing increased quantity of solid constituents, but by employing the spigot nozzle 514 consisting of an elastic body, by merely employing a simple structure, an efficient discharge of the slurry containing the solid constituents in a large quantity can be carried out.

If the second rotational flow becomes too intensive, then the granular substances with diameters exceeding desired one too are obliged to be discharged and thus diameter of granular substances discharged from the upper portion of the negative pressure type liquid cyclone 51X is controlled by introducing air inside the transfer pipe 516 and thus by adjusting the discharge pressure of the negative pressure type cyclone 51X.

Also, by affixing the shock absorbing rubber 519 on the inner wall of the lower portion of the body 511, the shocks exerted on the granular substances within the inner wall are absorbed so that violent motions of them within the inner wall can be prevented and also the granular substances with large diameters can be smoothly transferred to the lower portion.

Figure 14:
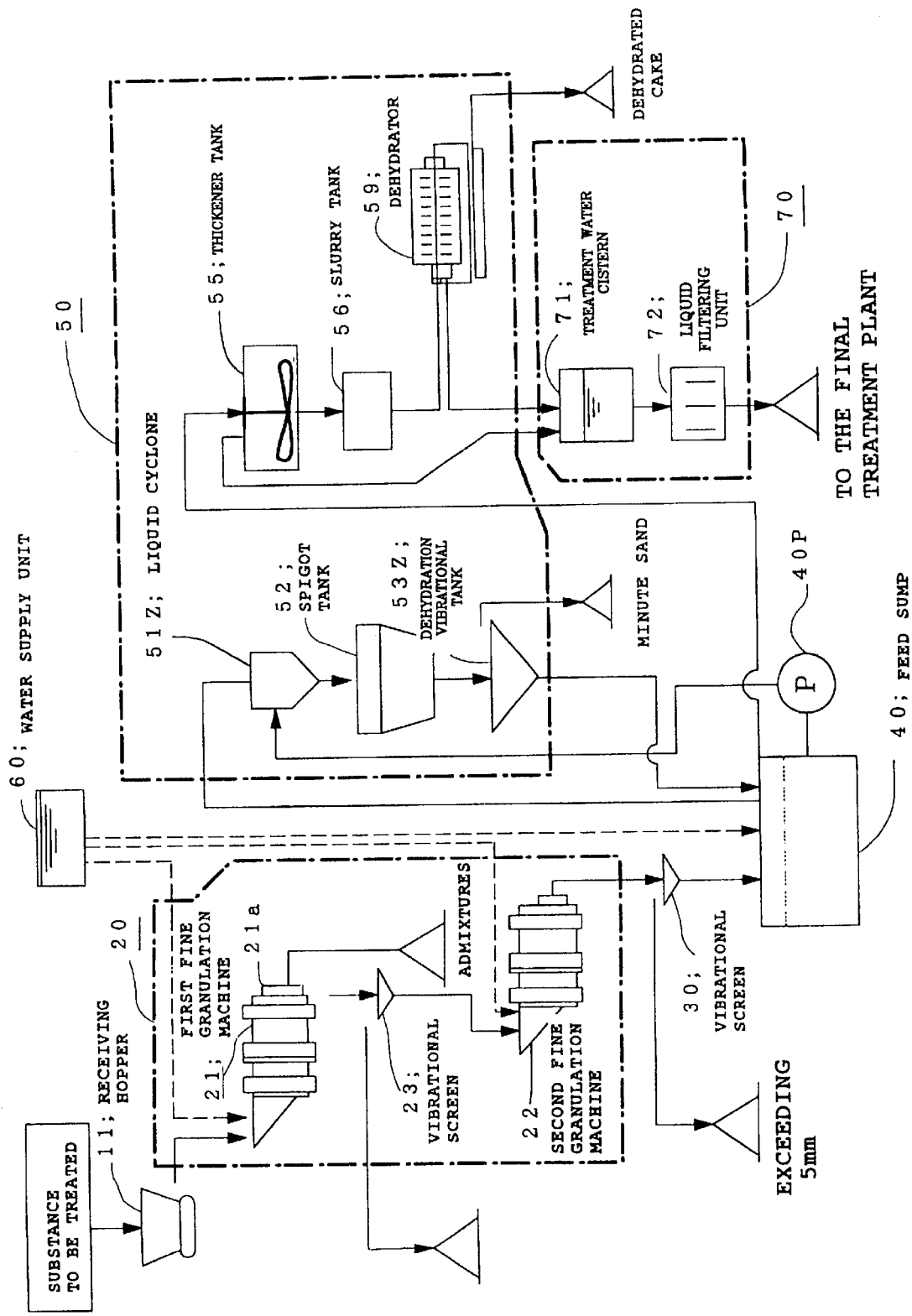
FIG. 14 shows the treatment system of the granular substances with pollutants adhered when a single unit of the liquid cyclone is used.
Figure 24:
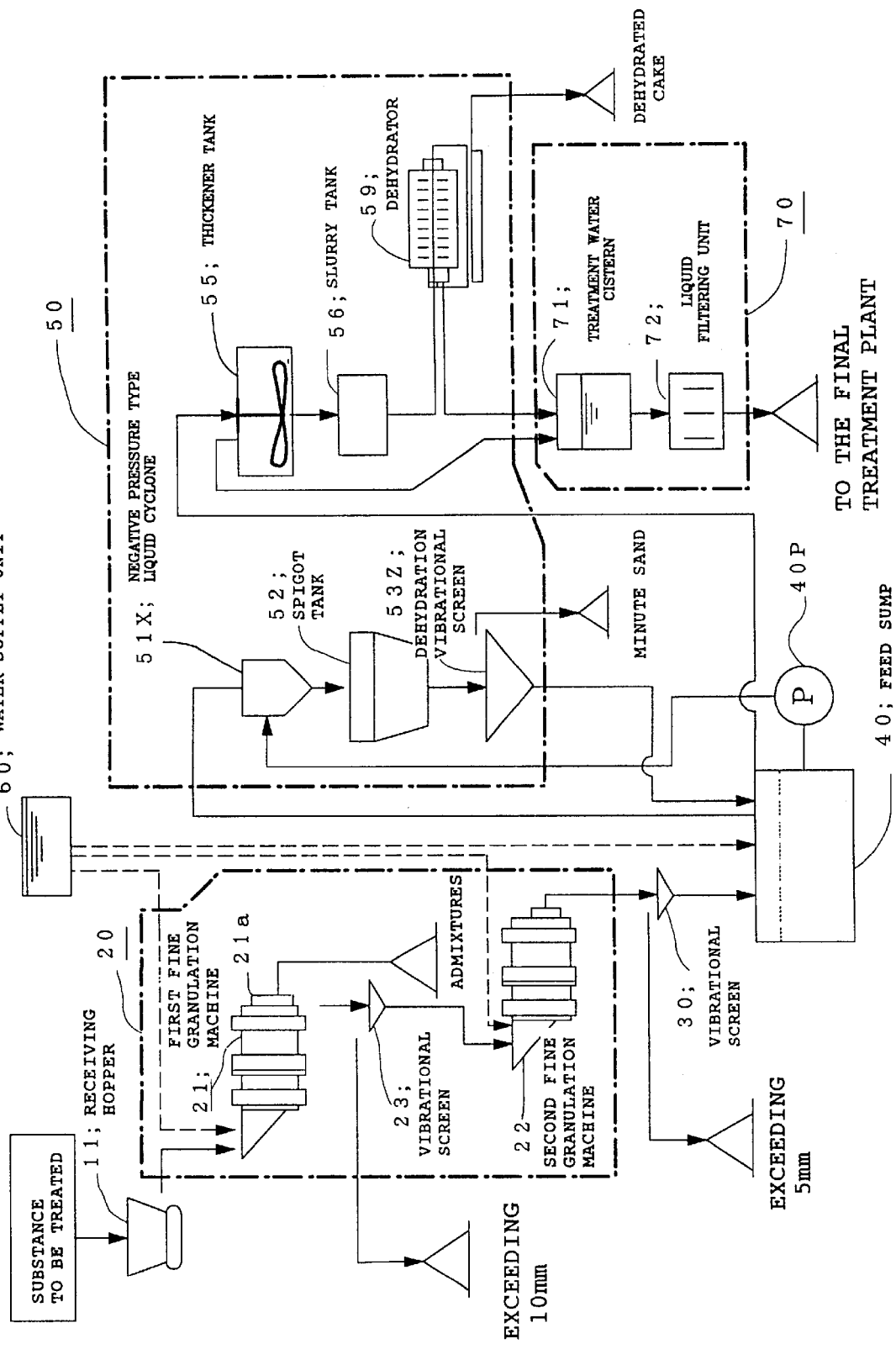
FIG. 24 shows the treatment system for treatment of the granular substances with pollutants adhered with a use of the negative pressure type liquid cyclone.

FIG. 24 shows an example of a treatment system of contaminated soils utilizing the negative pressure type liquid cyclone 51X and the system takes similar construction with a single liquid cyclone used as shown by FIG. 14.

The treatment substances in slurry state containing the granular substances below 5 mm stored in the feed sump 40 are transferred to the negative pressure type liquid cyclone 51X and, by having the extra minute grains below about 50 $\mu$m suspended, they are separated in the treatment water and the treatment water containing the granular substances are turned back to the feed sump 40 through the transfer pipe 516 and a large quantity of the slurry containing solid constituents, which consist of granular substances with large diameters discharged from the spigot nozzle 4 at the bottom portion of the negative pressure type liquid cyclone, is transferred to the spigot tank 52; the slurry is, after the granular substances (minute sands) mainly consisting of sands exceeding about 50 $\mu$m are separated from it, turned back to the feed sump 40.

In this way, according to the Embodiment 4, the large granular substances without containing the pollutants are separated from the granular substances, which have been subjected to the treatments of disintegration and glue breaking through the granulation system 20, by using the negative pressure type liquid cyclone 51X, which is provided with the spigot nozzle 514 consisting of an elastic body attached to the treatment substance discharge pipe 513 installed at a lower portion of the cylindrical body 511, and as a consequences, the slurry containing plenty of solid constituents consisting of granular substances having large diameters can be discharged from the lower portion of the negative pressure type liquid cyclone. Accordingly, the granular substances having large diameters without containing pollutants can be separated efficiently and thus the classification efficiency can be improved remarkably.

Figure 25:
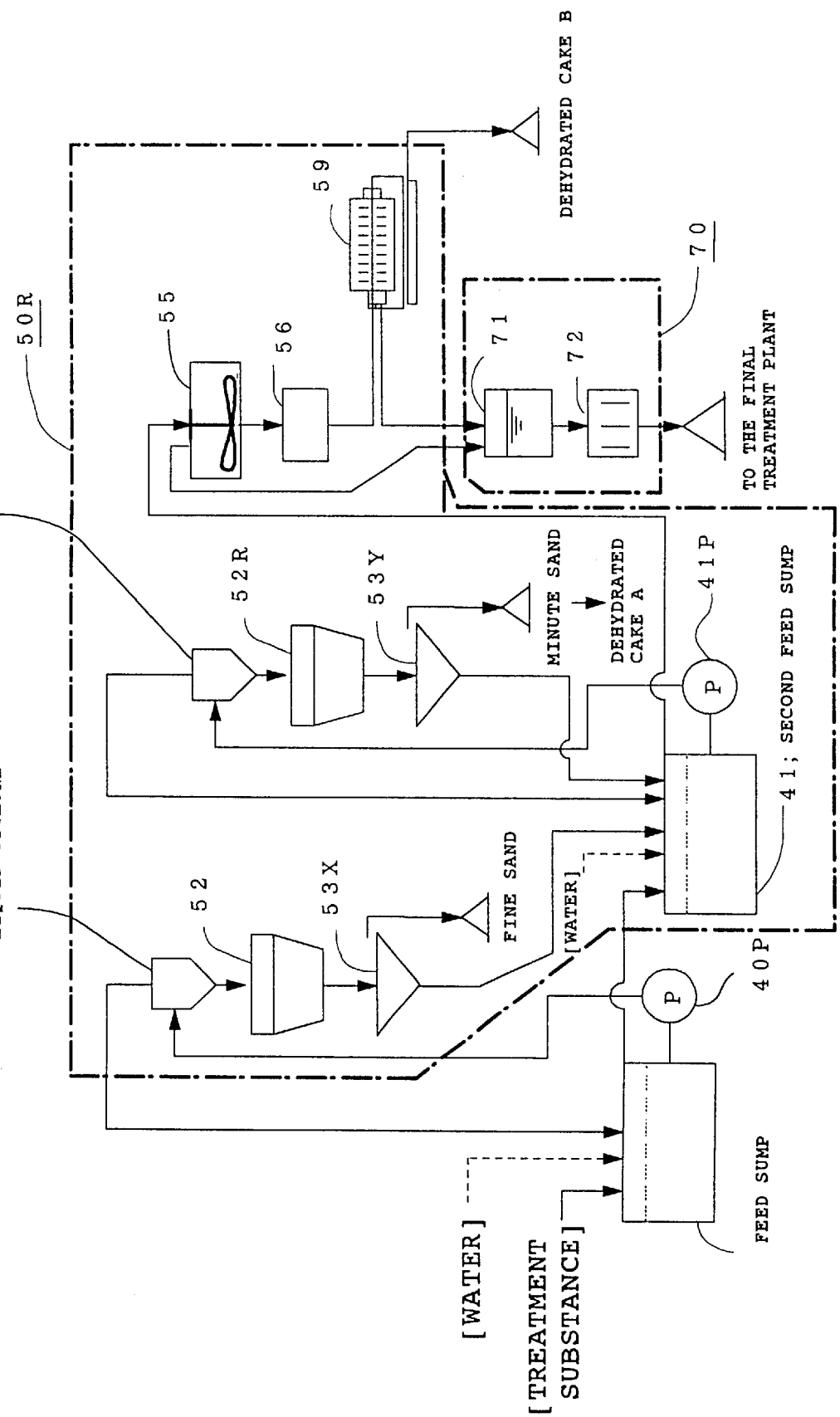
FIG. 25 shows the treatment system for treatment of the granular substances with pollutant adhered with a use of two units of negative pressure type liquid cyclones.

In the Embodiment 4, a case of using a single negative pressure type liquid cyclone 51X was exemplified. But by providing a classification means being provided with a negative pressure type liquid cyclone 51Y, whose discharge pressure is adjusted to lower than that of the negative pressure type liquid cyclone 51X, at a latter stage of the classification means being provided with the negative pressure type liquid cyclone 51X as shown by FIG. 25, the granular substances consisting of sands exceeding, for example, about 50 $\mu$m can be separated by the negative pressure type liquid cyclone at former stage 51X and the dehydration vibrational screen 53X and then, the granular substances mainly consisting of extra minute sands of 10–50 $\mu$m can be separated by the negative pressure type liquid cyclone 51Y and by the dehydration vibrational screen 53Y.

Thus, the granular substances having large diameters with pollutants not adhered are separated efficiently further from the granular substances to which pollutants such as soils contaminated by heavy metals and by oily constituents and from incinerated ashes transferred from a incinerator and thus, classification efficiency can be improved further.

Suppose a dehydrated cake A is made of extra minute sands classified by the dehydration vibrational screen 53Y, this dehydrated cake A consists of, unlike the dehydrated cake B being made from the contaminated soils in the state of slurry deposited at the bottom of the thickner tank 55, extra minute sands without containing pollutants, and consequently, recycling can be available without being subjected to a treatment for rendering it unnoxious.

Now, in the above example, the discharge pressure of the negative pressure type liquid cyclone 51X and 51Y are adjusted by respective discharge pressure adjustment means 7 so that classification of the granular substances below 50 $\mu$m and the same below 10 $\mu$m can be carried out by means of the negative pressure type liquid cyclone 51X and 51Y, respectively; however, the magnitudes of the above negative pressure should not be limited to the case as above and they should be determined suitably depending on the construction of treatment system and treatment substances, etc. Also by providing the negative pressure type liquid cyclone of more than three stages, it is possible to expand the range of size of the granular substances to be classified to more than three grades.

Embodiment 5

Figure 26:
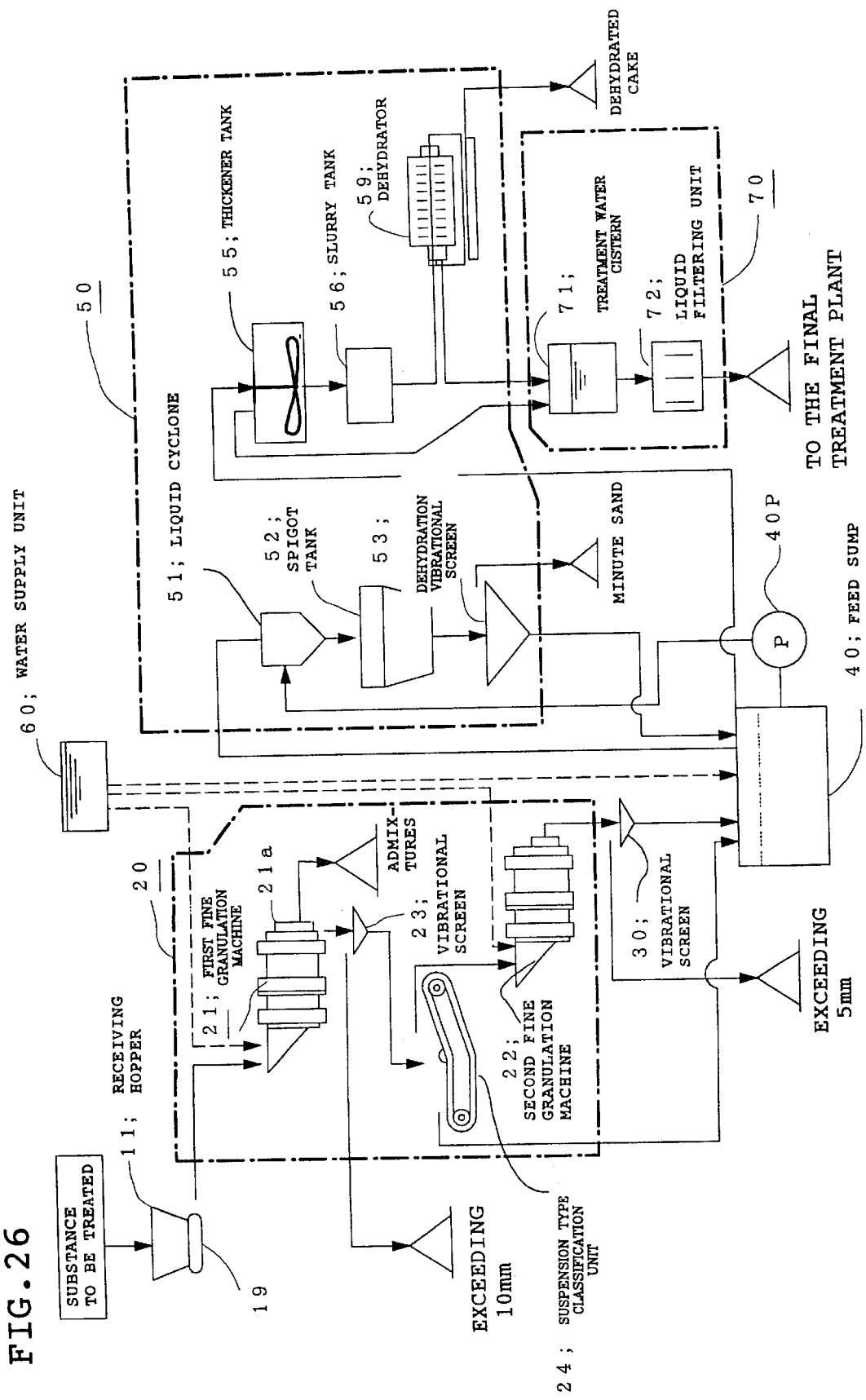
FIG. 26 shows the treatment system for treatment the granular substances with pollutants adhered according to Embodiment 5.

In the Embodiment 2, the disintegration and glue breaking efficiency of the second stage fine granulation machine is improved by pouring the granular substances below 10 $\mu$m of diameters into the second stage fine granulation machine upon installing the sorting vibrational screen 23 between the first stage fine granulation machine 21 and the second fine stage granulation machine 22 and yet, as shown by FIG. 26 the disintegration and glue breaking efficiency at the second stage fine granulation machine 22 and also the classification efficiency can be further improved by pouring the granular substances having diameters in a predetermined ranges, which have been dehydrated, into the second stage fine granulation machine 22 upon installing a suspension type classification unit 24 for treatments of dehydration and classification of the slurry passing through the vibrational screen 22.

Figure 27A:
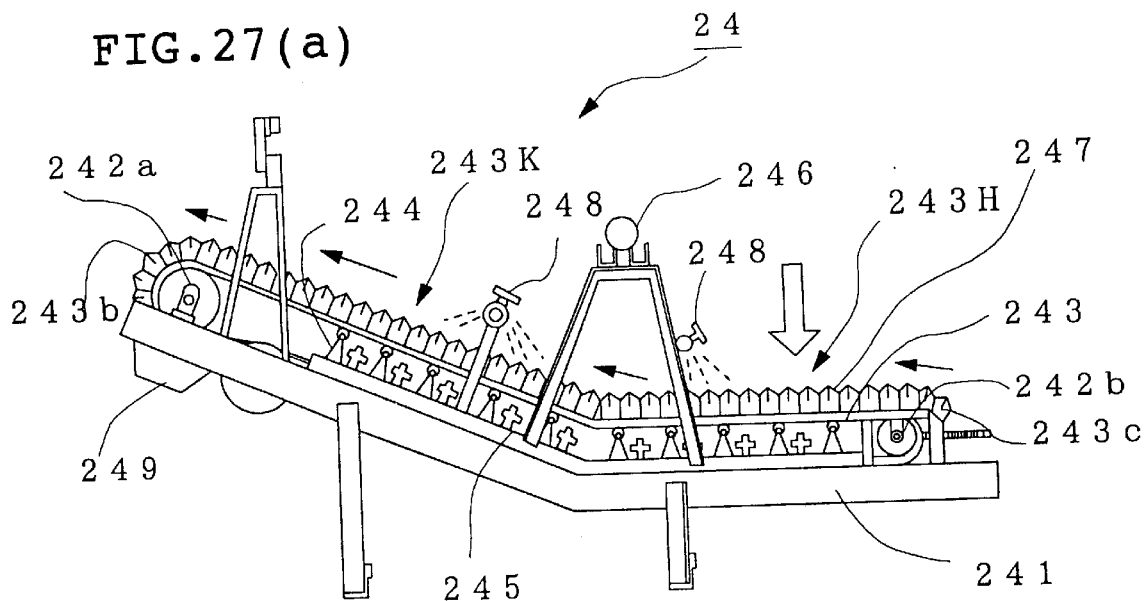
FIGS. 27(a), (b) show an example of constitution of the flotation classifying unit.
Figure 27B:
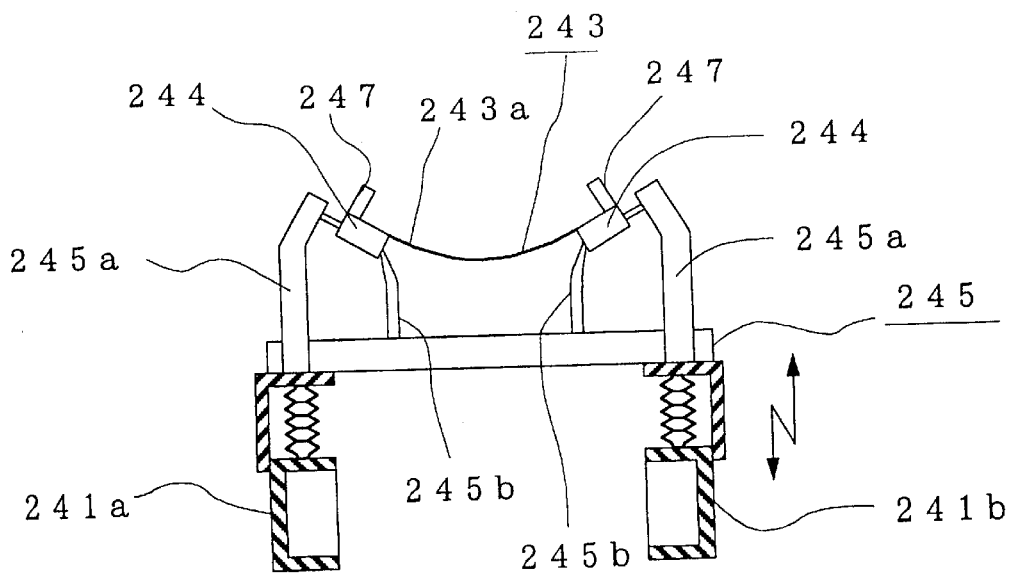

FIGS. 27(a) and (b) show an example of structure of a suspension type classification unit 24 and the classification unit 24 has a structure similar to the one already known as disclosed by the Japanese Laid-Open Patent Application No.H8-164363 and comprises a main frame 241 being provided with a pair of frames 241a, 241b one end of which are horizontal and the other side of which slope upwardly, a belt 243 which advances in the direction of the ascending slope from the horizontal portion of the main frame 241 between the frames 241a and 214b by means of a driving roller 242a and a passive frame 242b, a plurality of rotary rollers 244 being provided at both crosswise sides of the back surface of the treatment substance pouring face of the belt 243 and for supporting the belt 243, a vibrational frame 245 for supporting the rotational rotors 244 and being provided with a plurality of arms 245a for supporting each of an end of respective rotational rollers 244 and a plurality of arms 245b making contact with each another end of respective rollers 244, a vibrator 246 for vibrating the vibration frame 245, wave shaped standing walls 247 being arranged on both crosswise sides of the belt 243 and extending in the lengthwise direction of the belt 243, a water sprinkler 243 for sprinkling the treatment substances with water while moving them on the belt 243 and a discharge hopper 249 being provided at a lower portion of a turn back portion 243*b* of the slope portion 243K of the belt 243; by transferring the treatment substances poured to the horizontal portion 243H of the belt 243 in the direction of the ascending slope portion 243K while vibrating them and by excluding the granular substances having small diameters in the treatment substances by the sprinkler 248 and by discharging the granular substances having large diameters from the discharge hopper 249 while carrying out dehydration of them, the classification of the treatment substances are thus carried out.

The granular substances having large diameters being dehydrated by the suspension classification unit 24 are transferred to the second fine granular machine 22. Accordingly, since, into the second granulation machine 22, treatment substances, which are already dehydrated and have so small diameters as not to contribute to the disintegrating and glue breaking function, it is possible to carry out the glue breaking treatment by adding a suitable quantity of water to the poured substances. Therefore, the granular substances with pollutants adhered can be finely granulated sufficiently and also pollutants adhering to each of the individual granular substances of them can be separated certainly from each of the individual granular substances.

On the other hand, the granular substances having small diameters excluded by the sprinkler 248, are transferred together with the treatment water from unshown treatment water passage provided at a lower portion of the turn back portion 243*c* of the horizontal portion of the belt 243 to the first feed sump 40 and are stored therein (see FIG. 23).

In this way, in the Embodiment 5, after the granular substances with pollutants adhered being granulated through the first fine granulation machine 21 is sieved out by means of the sorting vibrational screen 23, the treatment water containing the granulation substances below 10 mm, which passed through the vibrational screen 23, is subjected to the treatments of dehydration and classification by means of the suspension type classification unit 24, and thereafter the granular substances having large diameters being subjected to the classification are arranged to be poured in the second fine granular machine 22, the glue breaking treatment mentioned as above can be carried out by adding a suitable quantity of water to the treatment substances poured in that machine 22. Accordingly, it is possible to carry out efficiently fine granulation of the granular substances with pollutants strongly adhered and also possible to separate the pollutants adhering to the surfaces of the granular substances from the granular substances certainly.

Now, in the Embodiment 5, though the treatment water containing the granular substances, which were granulated by the first granulation machine 21 and passed through the sorting vibrational screen 23 are subjected to the treatments of dehydration and classification by means of the suspension type classification machine 24, but, for example, other dehydration unit such as dehydration vibration screen can be used.

Also, by using the negative pressure type liquid cyclone 51X appearing in Embodiment 4, treatment of dehydration and classification of the treatment water including the granular substances mentioned as above can be carried out. The negative pressure type liquid cyclone 51X is arranged, as aforementioned above, to discharge the granular substances having small diameters efficiently from the upper portion and to accumulate the solid constituents comprising the granular substances having large diameters in the muddy water at the vicinity of the opening port 514 of the spigot nozzle 514 and thus to discharge the slurry, in which quantity of the solid constituents has become large, from the opening port 514S (see FIG. 23). Accordingly by means of the negative pressure type liquid cyclone carrying out the classification treatment of the treatment water containing the granular substances, which were finely granulation machine by the first granulation machine 21 and passed through the vibrational screen 23, and by pouring the slurry, in which quantity of solid constituents discharged from the opening port 514S has become large, into the second fine granular machine 22, the efficiency of carrying out the disintegration and glue braking by means of the second fine granulation machine can be improved.

Now, the treatment water containing granular substances having small diameters discharged from the upper portion of the negative pressure type liquid cyclone is transferred to the feed sump 40 and stored therein.

Embodiment 6

Figure 28:
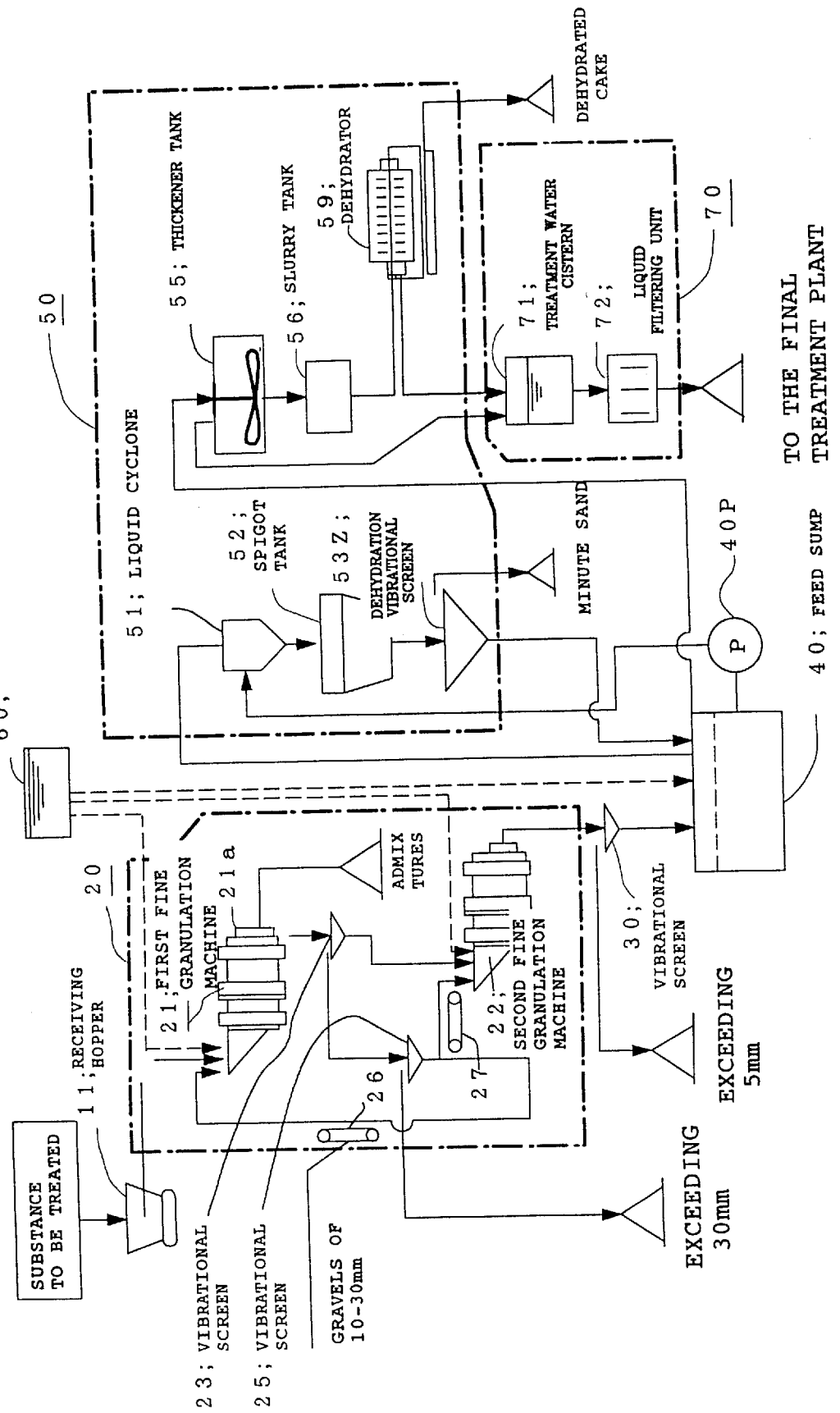
FIG. 28 shows a treatment system for treatment of contaminated soils according to Embodiment 6.

FIG. 28 shows an outline of the treatment system of the contaminated soils according to the Embodiment 6 of the present invention. The treatment system in the Embodiment 6 is adapted to provide, at a latter stage of the sorting vibrational screen 23, a second sorting vibrational screen 25 for carrying out the selection of granular substances having size of 10–30 mm such as stones and gravels out of those exceeding 10 mm and also is adapted to transfer thus selected granular substances of 10–30 $\mu$m such as stones and gravels to the first fine granulation machine and to the second fine granulation machine by means of the belt conveyer 26 and 27 respectively, and those first and second fine granulation machines are adapted to carry out disintegration and glue breaking of the contaminated soils to be treated in the state such that stones and gravels with their sizes of 10–30 mm are mixed in the contaminated soils to be treated.

Figure 29A:
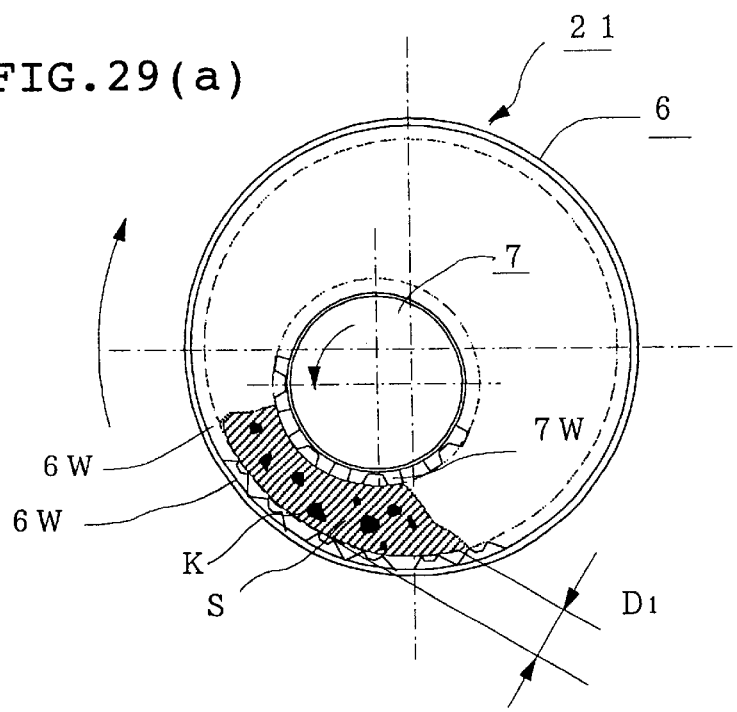
FIGS. 29(a), (b) are sectional views for comparison of the constitution of the first and second fine granulation machines according to Embodiment 6.
Figure 29B:
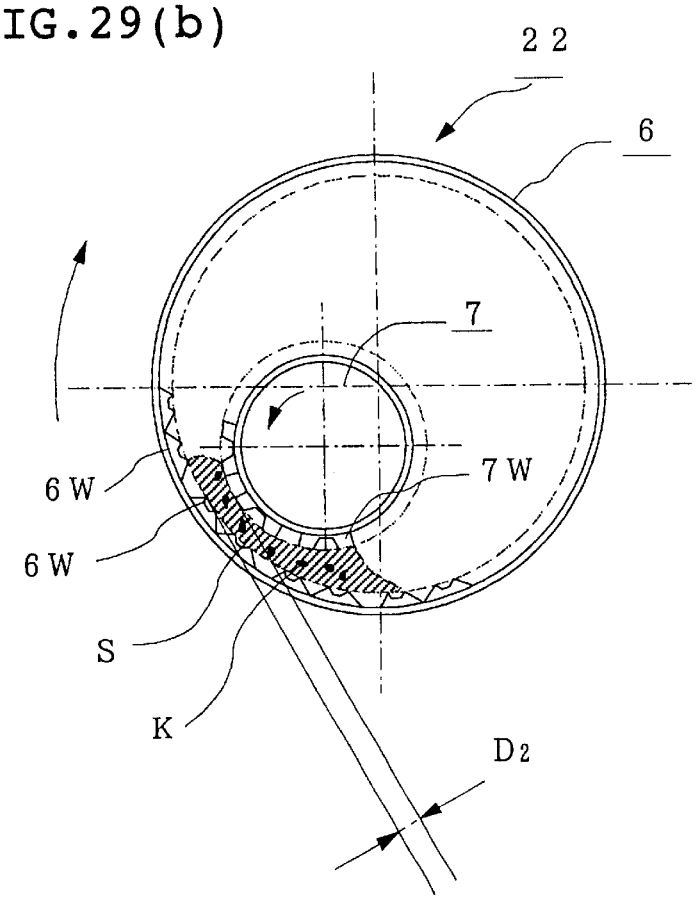
Figure 30:
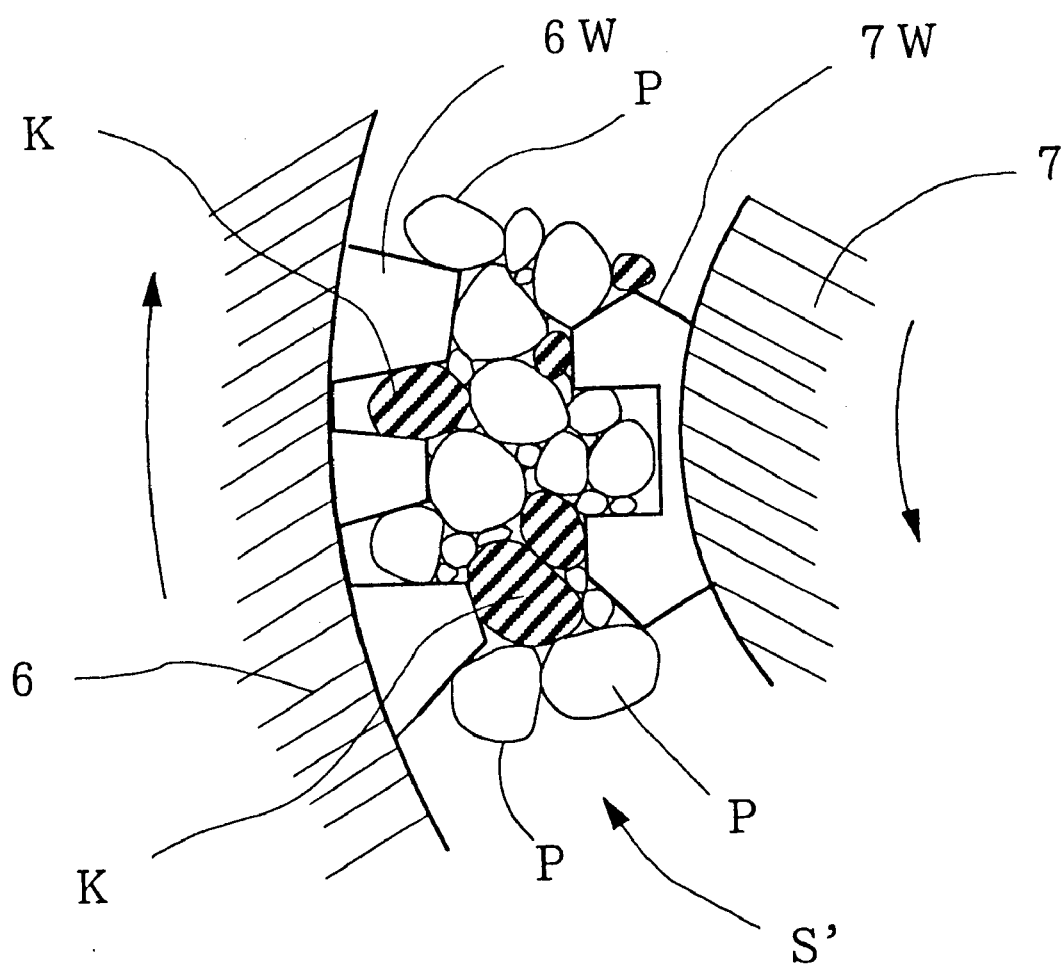
FIG. 30 illustrates the disintegration and glue breaking actions under the condition that hard substances are mixed.

The first fine granulation machine 21 for carrying out a coarse disintegration of the contaminated soils is, as shown by FIG. 29(*a*), arranged to make the gap $D_1$ between the rotary drum 6 and the rotor 7 relatively wide by reducing quantity of the eccentricity of the rotor 7 and also arranged to use a low rotational speed.

The second fine granulation machine 22 for mainly carrying out the glue breaking of the contaminated soils is, as shown by FIG. 29(*b*), adapted to reduce the gap $D_2$ between the rotary drum 6 and the rotor 7 by increasing the quantity of eccentricity of the rotor 7 and further adapted to raise the rotation speed higher than that of the first fine granulation machine 21 and also adapted to make the diameter of the rotor on the downstream side, similar to the fine granulation machine 20B as shown by FIG. 6(*b*), larger than that of the one on the upstream side and the treatment gap of the contaminated soils is arranged to be narrowed discontinuously on the downstream side. Now, in FIGS. 29(*a*) and (*b*), portion marked with oblique lines S shows the treatment substances being poured and the dark portion shows the granular substances such as stones and gravels having diameters of 10–30 mm with a high hardness (hereinafter referred to as hard substance) being classified through the second sorting vibrational screen 25.

Within the first fine granulation machine 21 or within the second fine granulation machine 23, the treatment substances S consisting of the contaminated soils P and the hard substances K poured into the gap between the rotary drum 6 and the rotor 7, i.e. the treatment space, are agitated upwardly by the outer blades 6W of the rotary drum and also are brought downwardly by the inner blades and therefore compressive stress as well as the shearing force are exerted on the contaminated soils P and the hard substances K and thus each individual granular substance, in the state of mass, of the contaminated soils is subjected to the treatments of disintegration and glue breaking.

Figure 31A:
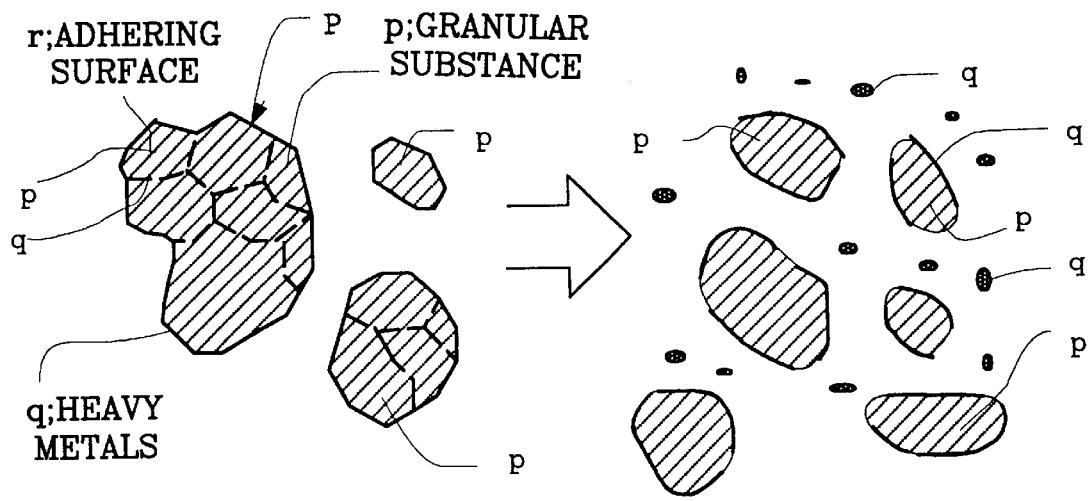
FIGS. 31(a), (b) illustrate the disintegration and glue breaking function under the condition that the hard substances are mixed.

This is to say that, as shown by FIG. 31(a), when the compressive stress and the shearing stress are exerted on the each of individual granular substances P in the massed granular state of contaminated soils, where the massed state is formed by mutual adhesions made at adhesion surfaces r of each granular substance, or acted on the granular substances P and on the hard substances K, which do not mutually adhere but are large in sizes, then each of the individual granular substances P in massed granular state are separated from the portion of adhering surface r and finely granulated to almost independent extra minute granular substances P (disintegration function).

At this time, the above hard substances K are not crushed in the first and second fine granulation machines 21 and 22 but, on the contrary, they make collisions with the granular substances P in the massed granular state and act on the granular substances P so that they are finely granulated to individual extra minute granular substances P. Accordingly, by mixing the hard substances K the disintegrating function is enhanced further.

In detail further, the hard substances K are agitated upwardly by the outer blades 6W or the inner blades 7W and thereafter accelerated being acted by a rotational force of some of blades and move within the first fine granulation machine 21 or the second fine granulation machine at a speed of, for example, 10 m/sec.

Accordingly, in the disintegrating action by means of the collision between the hard substances K and the granular substances P in the massed state, not only because the hardness of the hard substances K is high but because the hard substances are accelerated, energy at the time of collision is large, then comparing with the disintegration action caused by mutual collisions made among the treatment substances (contaminated soils), in which most of the poured substances of massed state to be treated consist of individual granular substances having small diameters and low hardness, the foregoing disintegration action realizes with by far high efficiency. Further, because of the high speed movement of the hard substances K due to acceleration acted on them, the number of times of collision of the hard substances K with the substances to be treated, which are the granular substances P in the state of mass, increases extremely and consequently the disintegrating action can be improved predominantly comparing with the one in the past.

Figure 31B:
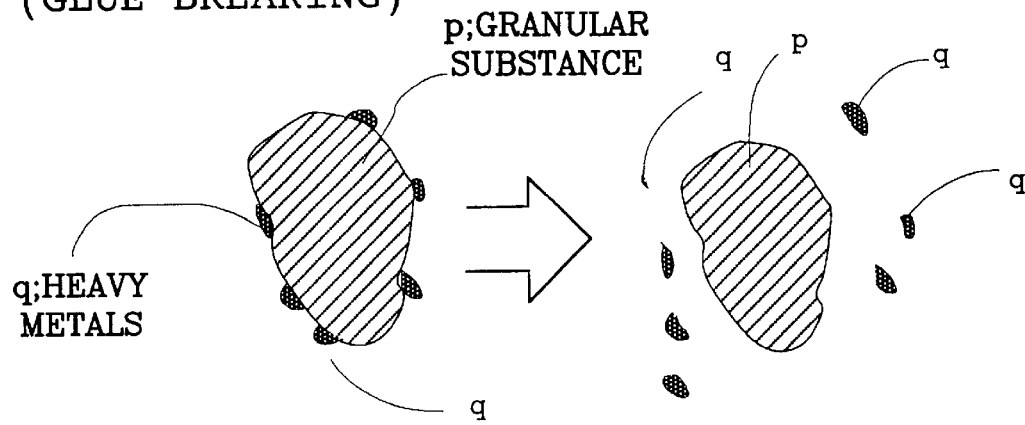
Figure 32A:
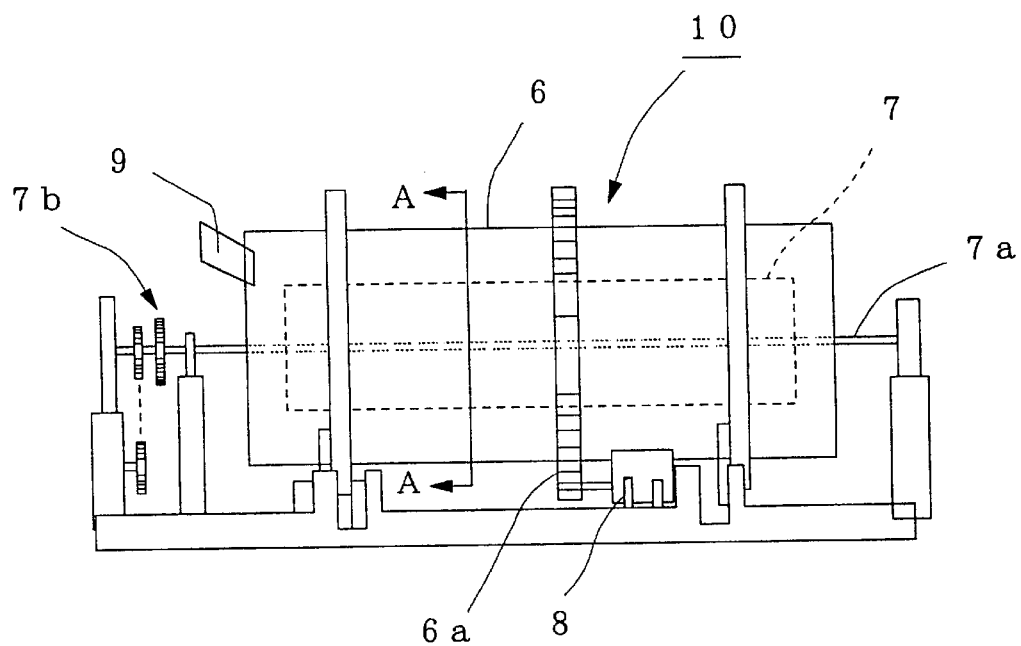
FIGS. 32(a), (b) show constitution of a conventional crushing machine.
Figure 32B:
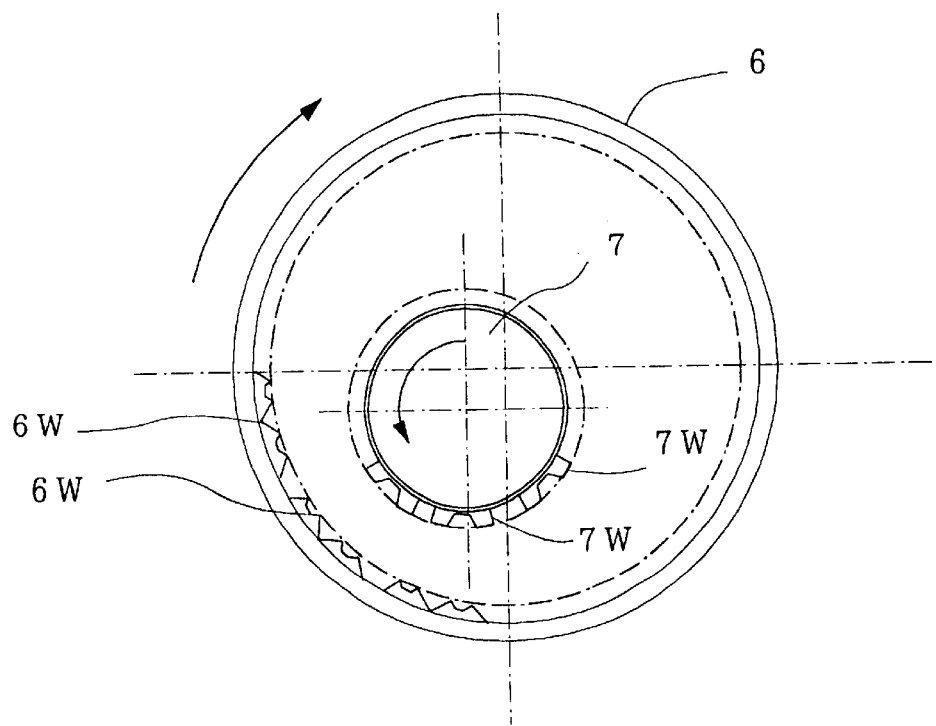

Also, as shown by FIG. 31(b), when a force acts on the granular substances or grains mutually in rubbing direction among themselves, the pollutants q such as heavy metals adhering to the each of the surfaces of the granular substances P are exfoliated and are separated from the granular substances (glue breaking). At this time, since the hard substances K are mixed in the contaminated soils P, in addition to the aforementioned frictions due to the mutual collisions among the granular substances P, the glue breaking is carried out by the frictions between the hard substances K and the granular substances P caused by the collisions between them. Since the hard substances K have larger diameters and higher hardness than those of the granular substances P and also are accelerated, similar to the case of disintegration mentioned as above, the glue breaking action advances remarkably comparing with that of the case where glue breaking action is merely caused by the mutual collisions among the granular substances P themselves. Accordingly, the pollutant having a large viscosity such as carbon and oily constituent and the pollutants such as heavy metals adhering strongly to the individual granular substances can be detached sufficiently.

Now, in the first fine granulation machine 21 and the second fine granulation machine 22, the mutual friction of the hard substances K too takes pace, the surfaces of the hard substances K are polished and become smooth.

Subsequently, a description on a treatment method of the contaminated soils according to the Embodiment 6 will be given.

The contaminated soils poured in the reception hopper 11 are transferred by the belt conveyer and are, together with the granular substances such as stones and gravels of around 10~30 mm being previously disintegrated by the first fine granulation machine 21 and sorted by the second vibrational sorting machine 24, poured in the first fine granulation machine 21.

Now, the quantity of the hard substances to be poured in is put in the range of 10~30% of the contaminated soils, i.e. the substances to be treated.

In the fine granulation machine 21, the contaminated soils poured in and the hard substances are subjected to the coarse disintegration in a relatively wide treatment space and the contaminated soils are moved to the downstream side of the first fine granulation machine 21 while carrying out separation of the contaminated soils in the state of mass into individual granular substances without destroying them then discharged from unshown discharge port. At this time, the extra minute fragments such as heavy metals adhering weakly to the surfaces of the contaminated soils are exfoliated and thus the exfoliated extra minute fragments are suspended in the treatment water. Also heavy metals, which resolve easily, dissolved in the above treatment water. Now, the first granulation machine 21 is arranged to make the stresses exerted on the contaminated soils relatively small and therefore, the contaminated soils are disintegrated to the slurry state having small diameters and also the hard substances mentioned as above, and the granular substances such as hard sands and gravels mixed in the contaminated soils poured in are discharged without being crushed.

The solid substances such as large heavy metals and admixtures discharged from the first fine granulation machine 21 are trapped and excluded by the mesh 21a for classification of about 30 mm and the contaminated soils containing granular substances and hard substances below 30 mm are sieved out by the first vibrational screen and the granular substances below 10 mm are transferred to the second fine granulation machine. On the other hand, the granular substances exceeding 10 mm are transferred to the second vibrational screen 25 and the sorted granular substances of 10~30 mm such as stones and gravels are transferred to the first fine granulation machine 21 and the second fine granulation machine 22 by the belt conveyers 26 and 27 respectively, and are used as hard substances to be mixed in the contaminated soils to be poured in the granulation machines. This is to say that, into the second fine granular machine 22, out of the granular substances having large diameters such as stones and gravels which were mixed in the contaminated soils being poured in, sorted granular substances of 10~30 mm are automatically poured as the hard substances K. Also quantity of hard substances K to be poured into the first fine granulation machine 21 is adjusted depending on the mixing rate of the hard substances such as stones and gravels. Also, there may be a case where the hard substances should not be mixed under certain condition of the contaminated soils to be poured in.

As aforementioned, in the second fine granular machine 22, the stresses acted on the contaminated soils are made larger than in the first fine granulation machine 21 and the above contaminated soils are mixed with the hard substances such as stones and gravels of 10~30 mm in their sizes being sorted by the vibrational screen, and consequently, mainly by means of the glue breaking action due to the mutual frictions of individual granular substances of the hard substances, the extra minute fragments such as carbon and oily constituents having high viscosity and heavy metals strongly adhering to the individual substances of the contaminated soils can be detached. At this time, heavy metals, which are easily dissolved in the treatment water, are dissolved in it and also extra minute fragments such as carbons, oily constituents, heavy metals and the like, which have been separated from the individual granular substances of the contaminated soils, are discharged, in the state of being suspended together with the contaminated soils from the unshown discharge port.

Further, since the second fine granulation machine 22 is arranged to make the rotor diameter on the downstream side larger than that of the upstream side and also arranged to make the treatment gap narrowed discontinuously toward downstream and thus the treatment substances can not flow smoothly to the downstream side and a part of the treatment substances are turned back to the upstream side and stay therein and as a consequence, the glue breaking treatment is further enhanced.

Also, the hard substances mixed in the contaminated soils and the granular substances such as sand gravels in the contaminated soils are, without being crushed, discharged in the state where their surfaces have become smooth by the glue breaking treatment. Also it is possible to arrange to have the hard substances remained in the second granulation machine 22 leaving as they are. The slurry of the contaminated soils and the granular substances such as sands and gravels are sieved out to the granular substances exceeding 5 mm by the vibrational screen 30; the granular substances below 5 mm are, after being stored temporally in the feed sump 40, transferred to the classification means 50 and are classified to the granular substances having various sizes. Treatments to be carried on, after the treatment by the classification means 50, are similar to those of the Embodiment 2, and therefore description on them are deleted.

Also, though in the Embodiment 6, the granular substances having large diameters such as stones and gravels which have been mixed in the treatment substances being discharged from the granulation machine are used as the hard substances to be mixed in the treatment substance, the similar effect can be produced by using the hard substances having larger diameters than those of the treatment substances such as sphere shaped stones, iron spheres, ceramic spheres, etc.

Now, in the example above, a description on the treatment method of contaminated soils were give, but treatments by means of the similar treatment system can be available to the case where the treatment substances are incinerated ashes or the contaminated soils containing incinerated ashes. However, because the dioxin class substances adhering to the incinerated ashes are extra minute particles in order to separate the extra minute particles which are suspended in the treatment water, treatment such as removal of them by means of, for example, a centrifugal separator is necessary. Noxious and contaminated mud containing largely the extra minute fragments such as dioxin class substances separated by the centrifugal separator are subjected to a treatment such as solidification through fusion and thereafter are abandoned.

According to the first aspect of the present invention, when carrying out the fine granulation of the granular substances with pollutants adhered by a fine granulation means in which granular substances with pollutants adhered are poured into a treatment gap of the fine granulation means and in which the granular substances are separated into independent granular substances and also in which pollutants adhering to surfaces of the granular substances are separated by having compressive forces exerted on the granular substances and having mutual rubbing forces acted on the same among themselves while adding water to the poured granular substances with pollutants adhered, the compressive stresses are arranged to be gradually increased, and consequently the disintegration treatment and the glue breaking treatment of the granular substances with pollutants adhered are carried out efficiently and the separation of the pollutants from the granular substances are carried out certainly.

According to the second aspect of the present invention, after carrying out the fine granulation treatment on the granular substances with pollutants adhered by a single fine granulation means, carrying out the fine granulation treatment for the second time by pouring the granulation substances, which were already subjected to the fine granulation treatment, into the same granulation means and at the time of second treatment, the stress to be applied to the granular substances are made larger than the one being applied previously, and thus disintegrating and glue breaking treatments of the granular substances with pollutants adhered are arranged to be carried out by a single equipment and those treatment can be managed by a single fine granulation means so that reduction in scale of the facilities can be advanced.

According to the third aspect of the present invention, the fine granulation of the granular substances with pollutants adhered is carried out by the fine granulation means, which is provided with a cylindrical rotary drum having a plurality of outer blades attached to an inner peripheral surfaces of the rotary drum toward its center and a rotor having a plurality of inner blades, which are attached to an outer peripheral surface along an axial direction protruding in a radial direction of the rotor, and which is installed within the rotary drum eccentrically with the same and is arranged to rotate in reversed direction of the rotary drum, and consequently, the compressive forces and mutual rubbing forces can be efficiently acted on the granular substances so that disintegrating and glue breaking treatments can be carried out certainly.

According to the fourth aspect of the present invention, under a condition that hard substances are mixed in the granular substances with pollutants adhered, the fine granulation treatment is carried out by accelerating the hard substances by rotating the rotary drum and the rotor in a mutually reversed direction, and by virtue of the disintegrating function and the glue breaking function, caused by the above arrangement, between the accelerated hard substances as above and the granular substances, the fine granulation of the granular substances are enhanced, and therefore massed granular substances such as contaminated soils and incinerated ashes can be finely granulated efficiently and also pollutants adhering to the individual granular substances can be separated certainly and efficiently.

According to the fifth aspect of the present invention, the treatment system of granular substances with pollutants adhered being provided with a single fine granulation means, in which by having compressive forces exerted on the granular substances with pollutants adhered and by having mutual rubbing forces acted on the same among said substances themselves, which have been poured into a treatment gap of the treatment system, while adding water to the granular substances, the granular substances are separated to independent granular substances and also the pollutants adhering to surfaces of the granular substances are separated, wherein the treatment gap of the fine granulation means is set narrow on the downstream side so that, by merely passing the granular substances with pollutants adhered through a single system, the disintegrating and the glue breaking treatments of the same can be carried out continuously resulting in simultaneous improvement of efficiency and reduction in scale of the facilities.

According to the sixth aspect of the present invention, the treatment system of granular substances with pollutants adhered is arranged such that a plurality of fine granulation means over a plurality of stages are provided for separating the granular substances to independent granular substances and separating the pollutants adhering to surfaces of the granular substances, while adding water to the granular substances being poured into a treatment gap, by having compressive forces exerted on the granular substances with pollutants adhered and by having mutual rubbing forces acted on the same among said substances themselves, wherein the granular substances pass through successively each of the granulation means and the treatment gaps are set gradually narrower at downstream stages; and thus the disintegrating and the glue braking treatments of the granular substances with pollutants adhered can be carried out efficiently and also pollutants such as heavy metals and dioxin class substances can be separated from the granular substances certainly.

According to the seventh aspect of the present invention, the treatment system of granular substances with pollutants adhered is provided with a means for carrying out dehydration treatment of a slurry discharged from a pre-stage fine granulation means and the substances, which have been subjected to the dehydration treatment, are poured into the fine granulation mean of latter stage, and hence in the granulation means at latter stage, the glue breaking treatment can be carried out by adding suitable amount of water to the poured substances and thus fine granulation of the granular substances can be carried out efficiently.

The fine granulation system for carrying out treatment of granular substances with pollutants adhered according to the eighth aspect of the present invention employs a fine granulation means according to the sixth aspect of the present invention, which is provided with a cylindrical rotary drum having a plurality of outer blades attached to an inner peripheral surface of the rotary drum toward its center and a rotor having a plurality of inner blades, which are attached to an outer peripheral surface along an axial direction protruding in a radial direction of the rotor, and being installed within the rotary drum eccentrically with the same and being adapted to rotate reversely against the rotary drum. Therefore, compressive force and mutual rubbing force can be efficiently exerted on the granular substances with pollutants adhered and disintegrating and glue breaking treatments can be carried on efficiently and certainly.

According to the ninth aspect of the present invention, the separation of the granular substances having large diameters such as stones and gravels mixed in the granular substances with pollutants adhered from the slurry discharged from the first stage fine granulation system is carried out, and the separated granular substances having large diameters are poured into a latter stage fine granulation system and the granular substances having large diameters are accelerated by rotating the rotary drum and the rotor in a mutually reversed direction under a condition that the granular substances and the granular substances having large diameters are mixed. Therefore, by means of the accelerated granular substances having large diameters, the disintegrating action and the glue breaking action are further enhanced and the massed granular substances such as contaminated soils and incinerated ashes can be finely granulated efficiently and also pollutants adhering to individual granular substances can be separated certainly and efficiently.

According to the tenth aspect of the present invention, the granular substances without containing pollutants and the granular substances having diameters inclusive of separated pollutants smaller them those of the granular substances without containing pollutants are separated out of the granular substances, which have been discharged from the fine granulation means according to claim 1, by a liquid cyclone, and consequently, the granular substances having large diameters without containing pollutants and the extra minute fragments containing pollutants can be separated certainly.

According to the eleventh aspect of the present invention, since separation of the granular substances having large diameters without containing pollutants from the granular substances, which is already subjected to the fine granulation, is carried out by a negative pressure type liquid cyclone whose discharge pressure is raised by providing a nozzle consisting of an elastic material at a discharge port arranged at a lower portion of the liquid cyclone, slurry containing plenty of hard constituents consisting of granular substances having large diameters can be discharged efficiently from the bottom of the negative pressure type of the liquid cyclone. Accordingly, the granular substances having large diameters without containing pollutants can be separated efficiently and thus the classification efficiency can be improved remarkably.

Also, since the means for squeezing the diameter of the discharge port of the lower portion is constituted by the nozzle consisting of an elastic material, by means of a simple constitution separation of slurry containing plenty of hard substances can be carried out.

According to the twelfth aspect of the present invention, the treatment is proceeded such that after carrying out fine granulation of the granular substances with pollutants adhered, while adding water to the granular substances, the granular substances are stored in a liquid supply cistern of the liquid cyclone, a treatment water containing the granular substances are supplied to the liquid cyclone from a lower portion of the liquid supply cistern, and the granular substances are classified with respect to size of the same and also the treatment water containing the granular substances having small diameters discharged from an upper portion of the liquid cyclone is turned back to the liquid supply cistern, and thus the granular substances having large diameters too, which are turned back and mixed in those one having small diameters, are transferred from a lower portion of the liquid supply cistern to the liquid cyclone and, as a result, granular substances having large diameters can be classified certainly.

What is claimed is:

1. A method of carrying out treatment of granular substance with pollutants adhered including a step of finely granulating said granular substances by a fine granulation means in which said granular substances with pollutants adhered are poured into a treatment gap of said fine granulation means and in which granular substances are separated into independent granular substances and also in which said pollutants adhering to surfaces of said granular substances are separated by having compressive forces exerted on said granular substances and having mutual rubbing forces acted on the same on the same among themselves while adding water to said poured granular substances with pollutants adhered, wherein in said fine granulation step, said compressive stress to be exerted on said granular substances are arranged to be gradually increased.

2. A method of carrying out treatment of granular substances with pollutants adhered according to claim 1, wherein after carrying out said fine granulation treatment on said granular substances with pollutants adhered by a single fine granulation means, carrying out said fine granulation treatment for the second time by pouring said granulation substances, which were already subjected to said fine granulation treatment, into the same fine granulation means and at the time of second treatment, said stress to be applied to said granular substances are made larger than the one being applied previously.

3. A method of carrying out treatment of granular substances with pollutants adhered according to claim 1, wherein said fine granulation means is provided with a cylindrical rotary drum having a plurality of outer blades attached to an inner peripheral surface of said rotary drum toward its center and a rotor having a plurality of inner blades, which are attached to an outer peripheral surface along an axial direction protruding in a radial direction of said rotor, and being installed within said rotary drum eccentrically with the same and being arranged to rotate in reversed direction of said rotary drum.

4. A method of carrying out treatment of granular substances with pollutants adhered according to claim 3, wherein, under a condition that hard substances are mixed in said granular substances with pollutants adhered, said fine granulation treatment is carried out by accelerating said substances by rotating said rotary drum and said rotor in a mutually reversed direction.

5. A method of carrying out treatment of granular substances with pollutants adhered, according to claim 1 wherein said granular substances without containing pollutants and said granular substances having diameters inclusive of separated pollutants smaller than those of said granular substances without containing pollutants are separated out of said granular substances, which have been discharged from said fine granulation means, by a liquid cyclone.

6. A method of carrying out treatment of granular substances with pollutants adhered according to claim 5, wherein separation of said granular substances having large diameters without containing pollutants out of said granular substances, which were already subjected to said fine granulation, is carried out by a negative pressure type liquid cyclone whose discharge pressure is raised by providing a nozzle consisting of an elastic material at a discharge port arranged at a lower portion of said liquid cyclone.

7. A method of carrying out treatment of granular substance with pollutants adhered according to claim 5, wherein after carrying out fine granulation of said granular substances with pollutants adhered while adding water to said granular substances, said granular substances are stored in a liquid supply cistern of said liquid cyclone, a treatment water containing said granular substances are supplied to said liquid cyclone from a lower portion of said liquid supply cistern, and said granular substances are classified with respect to size of the same and also said treatment water containing said granular substances having small diameters discharged from an upper portion of said liquid cyclone is turned back to said liquid supply cistern.

* * * * *